(12) United States Patent
Haine et al.

(10) Patent No.: US 10,387,444 B2
(45) Date of Patent: Aug. 20, 2019

(54) TOOLS FOR AUTO-VISUALIZATIONS OF DATA

(71) Applicant: SuccessFactors, Inc., South San Francisco, CA (US)

(72) Inventors: Dominic Philip Haine, San Francisco, CA (US); Maria Clarisse Gatchalian, San Francisco, CA (US); Anthony Ashton, Brisbane (AU); Lisa Meehan, Brisbane (AU); Anastasia Ellerby, Brisbane (AU)

(73) Assignee: SUCCESSFACTORS, INC., South San Francisco, CA (US)

( * ) Notice: Subject to any disclaimer, the term of this patent is extended or adjusted under 35 U.S.C. 154(b) by 219 days.

(21) Appl. No.: 14/984,182

(22) Filed: Dec. 30, 2015

(65) Prior Publication Data

US 2017/0046056 A1 Feb. 16, 2017

Related U.S. Application Data

(60) Provisional application No. 62/203,326, filed on Aug. 10, 2015.

(51) Int. Cl.
*G06F 16/28* (2019.01)
*G06F 16/26* (2019.01)
*G06Q 10/10* (2012.01)

(52) U.S. Cl.
CPC ........... *G06F 16/26* (2019.01); *G06Q 10/105* (2013.01)

(58) Field of Classification Search
CPC .. G06F 3/04847; G06F 3/04842; G06F 3/048; G06F 16/28
See application file for complete search history.

(56) References Cited

U.S. PATENT DOCUMENTS

| | | | | |
|---|---|---|---|---|
| 6,995,768 | B2* | 2/2006 | Jou | G06F 9/542 345/440 |
| 9,613,102 | B2* | 4/2017 | Anand | G06F 17/3053 |
| 9,633,076 | B1* | 4/2017 | Morton | G06F 16/248 |
| 2003/0071814 | A1* | 4/2003 | Jou | G06F 9/542 345/440 |
| 2008/0005677 | A1* | 1/2008 | Thompson | G06Q 10/00 715/744 |
| 2008/0222562 | A1* | 9/2008 | Helfman | G06F 17/246 715/810 |
| 2011/0137850 | A1* | 6/2011 | Mourey | G06Q 10/00 706/54 |
| 2011/0153643 | A1* | 6/2011 | Haggie | G06Q 10/06 707/769 |

(Continued)

*Primary Examiner* — Mahelet Shiberou
(74) *Attorney, Agent, or Firm* — Fountainhead Law Group P.C.

(57) ABSTRACT

Some embodiments provide a non-transitory computer-readable medium that stores a program executable by at least one processing unit of a first device. The program receives from a second device a selection of a set of measures associated with data. The program also receives from the second device a selection of a set of dimensions associated with data. The program further receives from the second device a selection of a type of analysis. Based on the set of measures, the set of dimensions, and the type of analysis, the program also determines a type of visualization of the set of measures and the set of dimensions.

20 Claims, 38 Drawing Sheets

(56) References Cited

U.S. PATENT DOCUMENTS

| | | | |
|---|---|---|---|
| 2012/0001918 A1* | 1/2012 | Sankaraswami | G06T 11/206 345/440 |
| 2013/0097177 A1* | 4/2013 | Fan | G06F 17/30554 707/748 |
| 2014/0071138 A1* | 3/2014 | Gibson | G06T 11/206 345/501 |
| 2015/0067565 A1* | 3/2015 | Yan | G06F 3/0484 715/771 |
| 2015/0346956 A1* | 12/2015 | Peters | G06F 3/0482 715/771 |
| 2016/0085835 A1* | 3/2016 | Wong | G06F 16/26 707/602 |
| 2016/0124960 A1* | 5/2016 | Moser | G06F 17/30554 707/723 |

\* cited by examiner

TOOLS FOR AUTO-VISUALIZATIONS OF DATA

CROSS-REFERENCE TO RELATED APPLICATION

The instant non-provisional patent application claims priority to U.S. Provisional Patent Application No. 62/203,326 filed Aug. 10, 2015 and incorporated by reference in its entirety herein for all purposes.

BACKGROUND

Charts and graphs are often used to present data in a visual manner. To create a chart or graph, a user may manually select one or more variables of interest and a type of chart or graph to use to present the data associated with the variables of interest. Typically, the user must be aware of the types of charts or graphs to use to best present the data in a meaningful and useful manner.

SUMMARY

In some embodiments, a non-transitory computer-readable medium stores a program executable by at least one processing unit of a first device. The program receives from a second device a selection of a set of measures associated with data. The program also receives from the second device a selection of a set of dimensions associated with data. The program further receives from the second device a selection of a type of analysis. Based on the set of measures, the set of dimensions, and the type of analysis, the program also determines a type of visualization of the set of measures and the set of dimensions.

In some embodiments, the program further generates the type of visualization of the set of measures and the set of dimensions. The program may also provide the generated type of visualization to the second device for the second device to display though a graphical user interface.

In some embodiments, determining the type of visualization includes determining a number of measures in the set of measures and a number of dimensions in the set of dimensions and determining the type of visualization of the set of measures and the set of dimensions further based on the number of measures in the set of measures and the number of dimensions in the set of dimensions. Determining the type of visualization may further include determining a type of dimension for each dimension in the set of dimensions and determining the type of visualization of the set of measures and the set of dimensions further based on the types of dimensions in the set of dimensions. Determining the type of visualization may also include determining a first subtype of the type of visualization of the set of measures and the set of dimensions when the set of dimensions includes a time-based dimension and determining a second subtype of the type of visualization of the set of measures and the set of dimensions when the set of dimensions includes types of dimensions other than a time-based dimension. In some embodiments, the program provides a graphical user interface (GUI) to the second device for receiving the selections of the set of measures, the set of dimensions, and the type of analysis.

In some embodiments, a method receives from a second device a selection of a set of measures associated with data. The method also receives from the second device a selection of a set of dimensions associated with data. The method further receives from the second device a selection of a type of analysis. Based on the set of measures, the set of dimensions, and the type of analysis, the method also determines a type of visualization of the set of measures and the set of dimensions.

In some embodiments, the method further generates the type of visualization of the set of measures and the set of dimensions. The method may also provide the generated type of visualization to the second device for the second device to display though a graphical user interface.

In some embodiments, determining the type of visualization includes determining a number of measures in the set of measures and a number of dimensions in the set of dimensions and determining the type of visualization of the set of measures and the set of dimensions further based on the number of measures in the set of measures and the number of dimensions in the set of dimensions. Determining the type of visualization may further include determining a type of dimension for each dimension in the set of dimensions and determining the type of visualization of the set of measures and the set of dimensions further based on the types of dimensions in the set of dimensions. Determining the type of visualization may also include determining a first subtype of the type of visualization of the set of measures and the set of dimensions when the set of dimensions includes a time-based dimension and determining a second subtype of the type of visualization of the set of measures and the set of dimensions when the set of dimensions includes types of dimensions other than a time-based dimension. In some embodiments, the method provides a graphical user interface (GUI) to the second device for receiving the selections of the set of measures, the set of dimensions, and the type of analysis.

In some embodiments, a system includes a user interface (UI) manager configured to receive from a device a selection of a set of measures associated with data, a selection of a set of dimensions associated with data, and a selection of a type of analysis. The system also includes a visualization type manager configured to determine a type of visualization of the set of measures and the set of dimensions based on the set of measures, the set of dimensions, and the type of analysis.

In some embodiments, the system further includes a visualization generator configured to generate the type of visualization of the set of measures and the set of dimensions. The UI manager may further be configured to provide the generated type of visualization to the device for the device to display though a graphical user interface.

In some embodiments, the visualization type manager determines the type of visualization by determining a number of measures in the set of measures and a number of dimensions in the set of dimensions and determining the type of visualization of the set of measures and the set of dimensions further based on the number of measures in the set of measures and the number of dimensions in the set of dimensions. The visualization type manager may determine the type of visualization by further determining a type of dimension for each dimension in the set of dimensions and determining the type of visualization of the set of measures and the set of dimensions further based on the types of dimensions in the set of dimensions. The visualization type manager may determine the type of visualization by also determining a first subtype of the type of visualization of the set of measures and the set of dimensions when the set of dimensions includes a time-based dimension and determining a second subtype of the type of visualization of the set of measures and the set of dimensions when the set of dimensions includes types of dimensions other than a time-based dimension.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention may include some or all of the features in these examples alone or in combination with other features described below, and may further include modifications and equivalents of the features and concepts described herein.

Some embodiments provide a novel tool for automatically generating visualizations of data based on the selection of one or more variables of data (e.g., measures and/or dimensions of data). In some embodiments, the tool determines different types of visualizations to generate based on the selection of different variables and/or combinations of variables. To generate a visualization, the tool may automatically associate each of the selected variables to an axis of the visualization. In some embodiments, the tool automatically selects additional variables to include in the generation of the visualization.

In some embodiments, data is organized and stored according to a dimensional modeling technique. In some such embodiments, data is organized and stored according to measures and dimensions. A measure may be numerical value of data while a dimension may be data for categorizing the measures (i.e., the numerical values of data). In some embodiments, data organized and stored according to a dimensional modeling technique may be stored in a star schema or snowflake schema (e.g., in a relational data warehouse or in a special-purpose data management system). In some such embodiments, measures are derived from the records in fact tables and dimensions are derived from dimension tables.

Figure 1A:
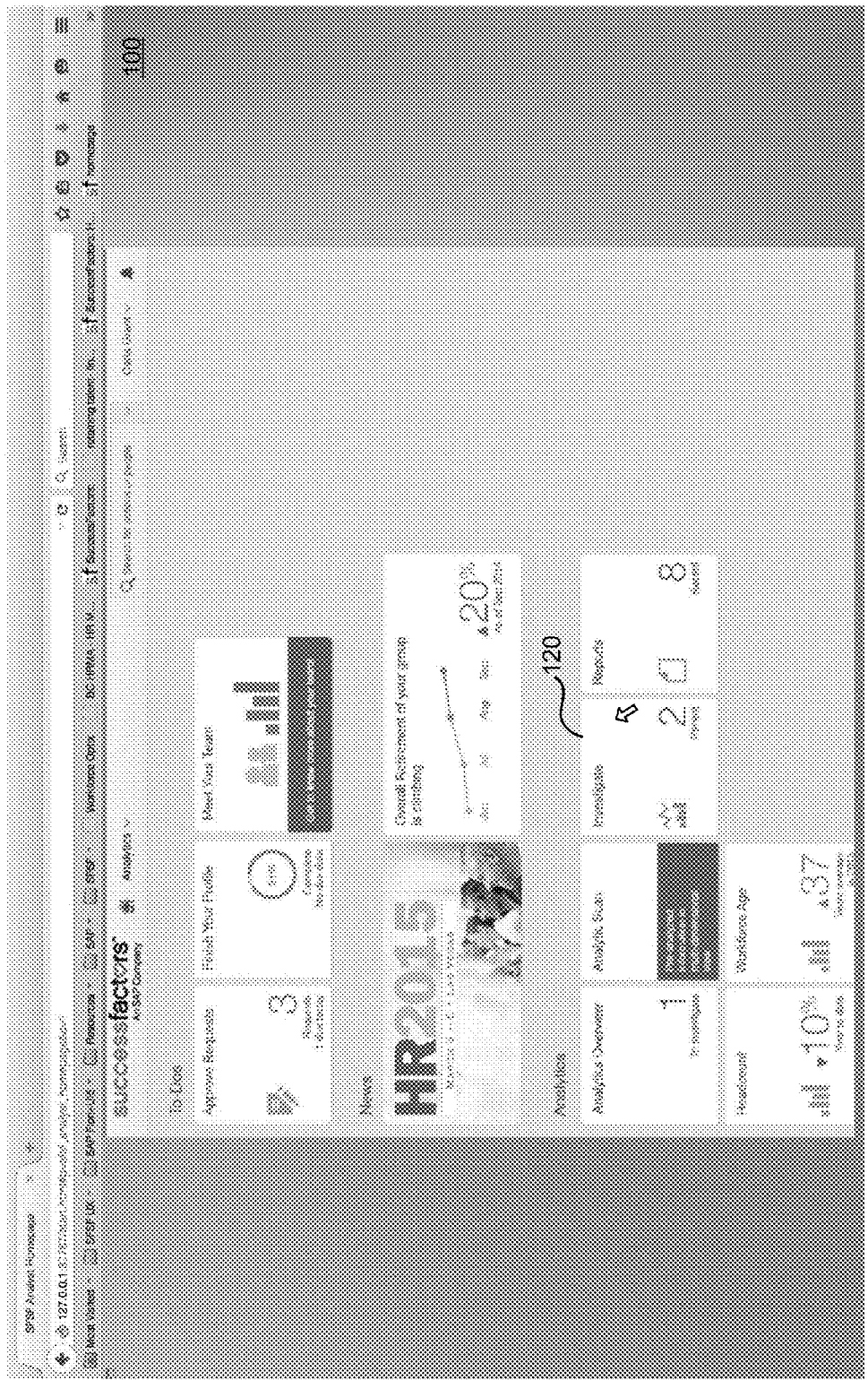
FIGS. 1A-1O illustrate a tool for automatically generating visualizations according to some embodiments.

FIGS. 1A-1O illustrate a tool for automatically generating visualizations according to some embodiments according to some embodiments. Specifically, FIGS. 1A-1O illustrate a graphical user interface (GUI) 100 at fifteen different stages 101-115 of generating visualizations according to some embodiments.

In FIG. 1A, the first stage 101 shows the GUI 100 displaying several selectable items. In particular, the first stage 101 shows a user using a selection tool (e.g., a cursor) to select a user selectable item 120 for navigating to a page for investigating analytics. Upon selection of the selectable item 120, the GUI 100 transitions to displaying a page for initiating a new investigation.

Figure 1B:
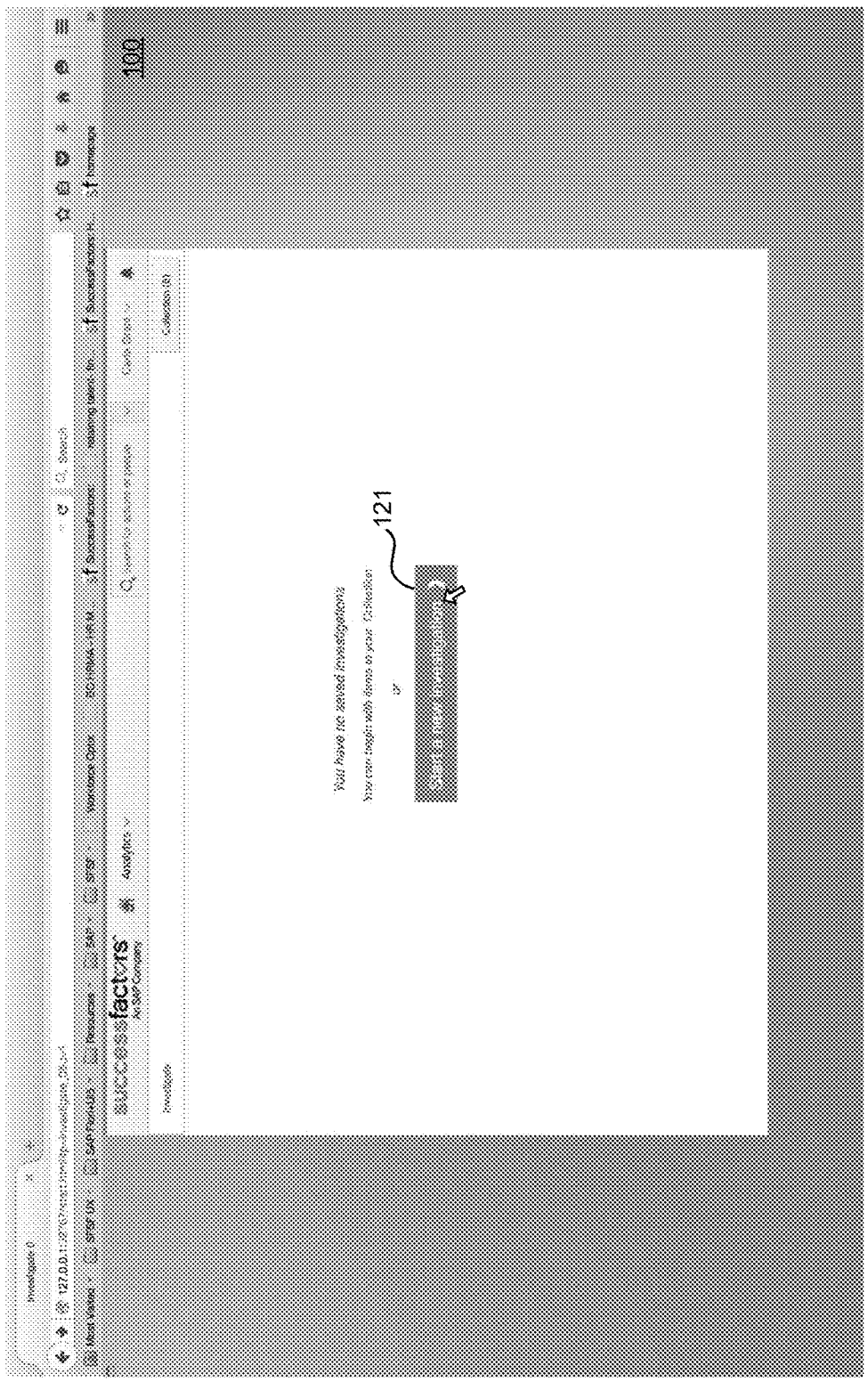

In FIG. 1B, the second stage 102 illustrates the GUI 100 after the user selects the selectable item 120. As shown, the GUI 100 in the second stage 102 is displaying a selectable item 121 for starting a new investigation. At the second stage 102, the user is using the selection tool to select the selectable item 121. Upon selection of the selectable item 121, the GUI 100 transitions to displaying a page that includes a pane displaying several selectable data variables.

Figure 1C:
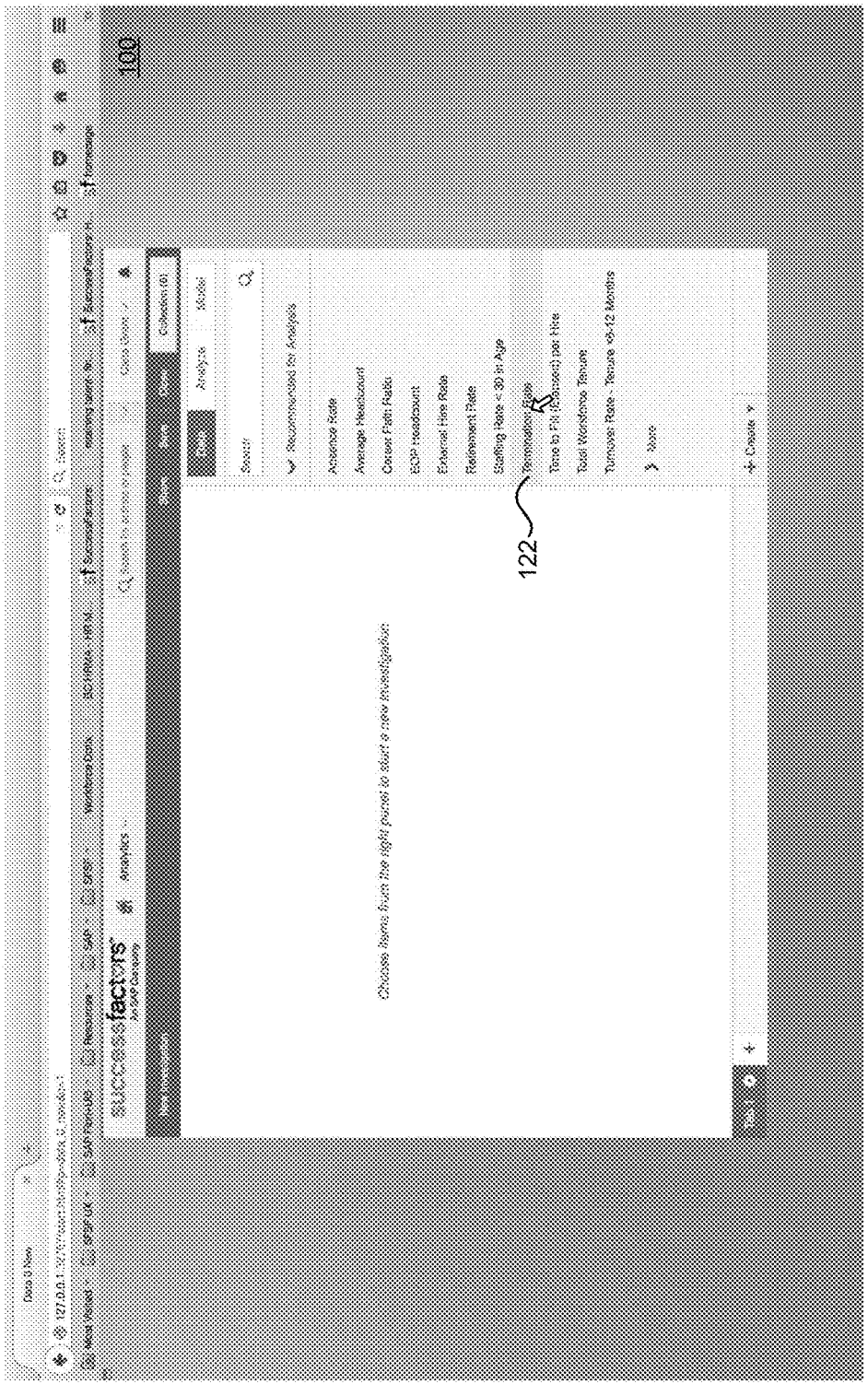

In FIG. 1C, the third stage 103 shows the GUI 100 after the user selects the selectable item 121. As illustrated, the GUI 100 in the third stage 103 is displaying a selectable item 122 for selecting a "Termination Rate" data variable (e.g., a measure). At the third stage 103, the user is using the selection tool to select the selectable item 122. Upon selection of the selectable item 122, the GUI 100 transitions to displaying a page that includes a visualization based on the "Termination Rate" data variable.

Figure 1D:
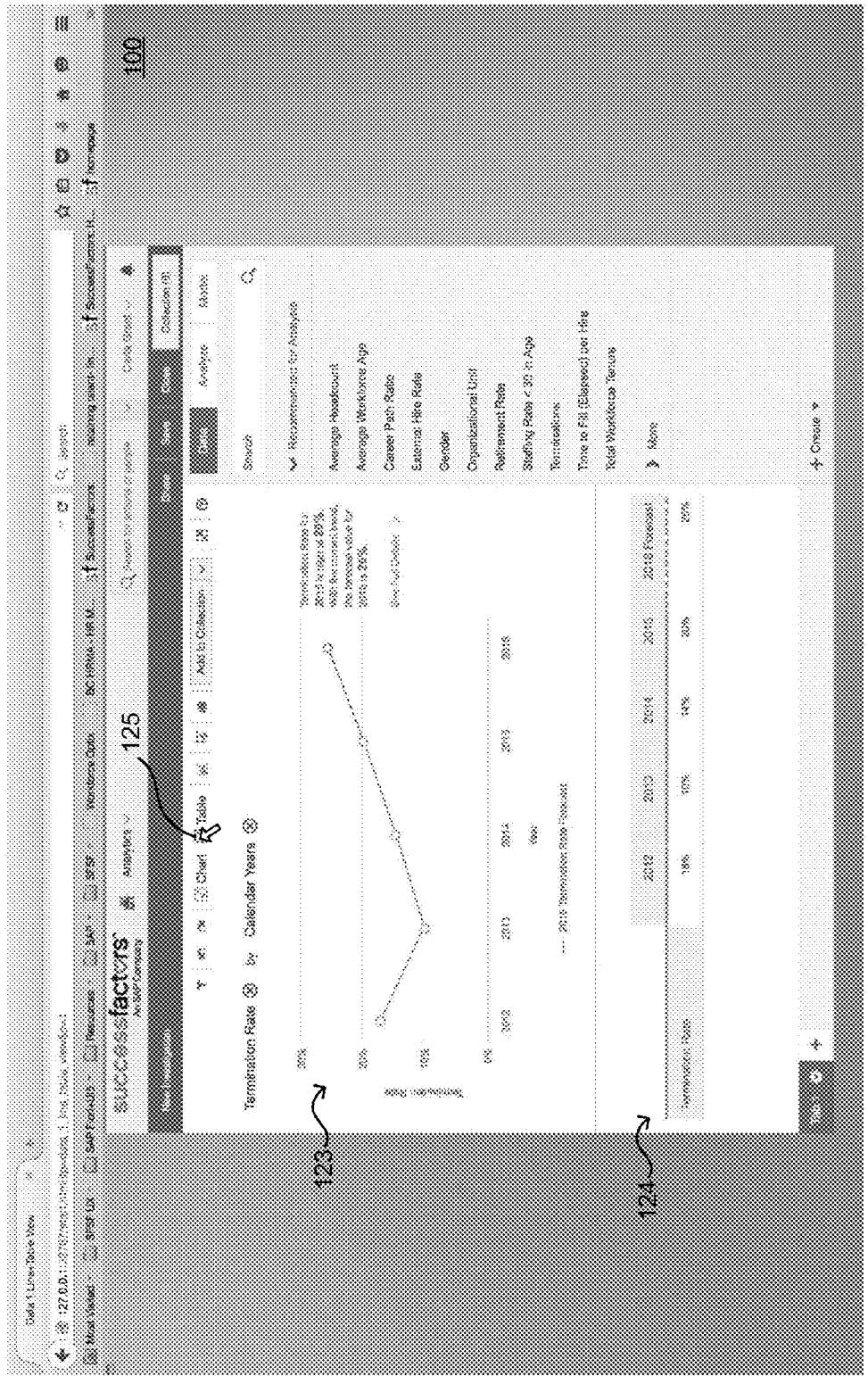

In FIG. 1D, the fourth stage 104 illustrates the GUI 100 after the user selects the selectable item 122. As shown, the GUI 100 in the fourth stage 104 is displaying a trend visualization 123 of the "Termination Rate" data variable and a calendar year data variable (e.g., a dimension) that is automatically generated in response to the selection of the "Termination Rate" data variable. In addition, the GUI 100 in the fourth stage 104 is displaying a tabular visualization 124 of the "Termination Rate" data variable. The fourth stage 104 also shows the user using the selection tool to select a selectable item 125. Upon selection of the selectable item 125, the GUI 100 transitions to displaying a page that does not include the tabular visualization 124.

Figure 1E:
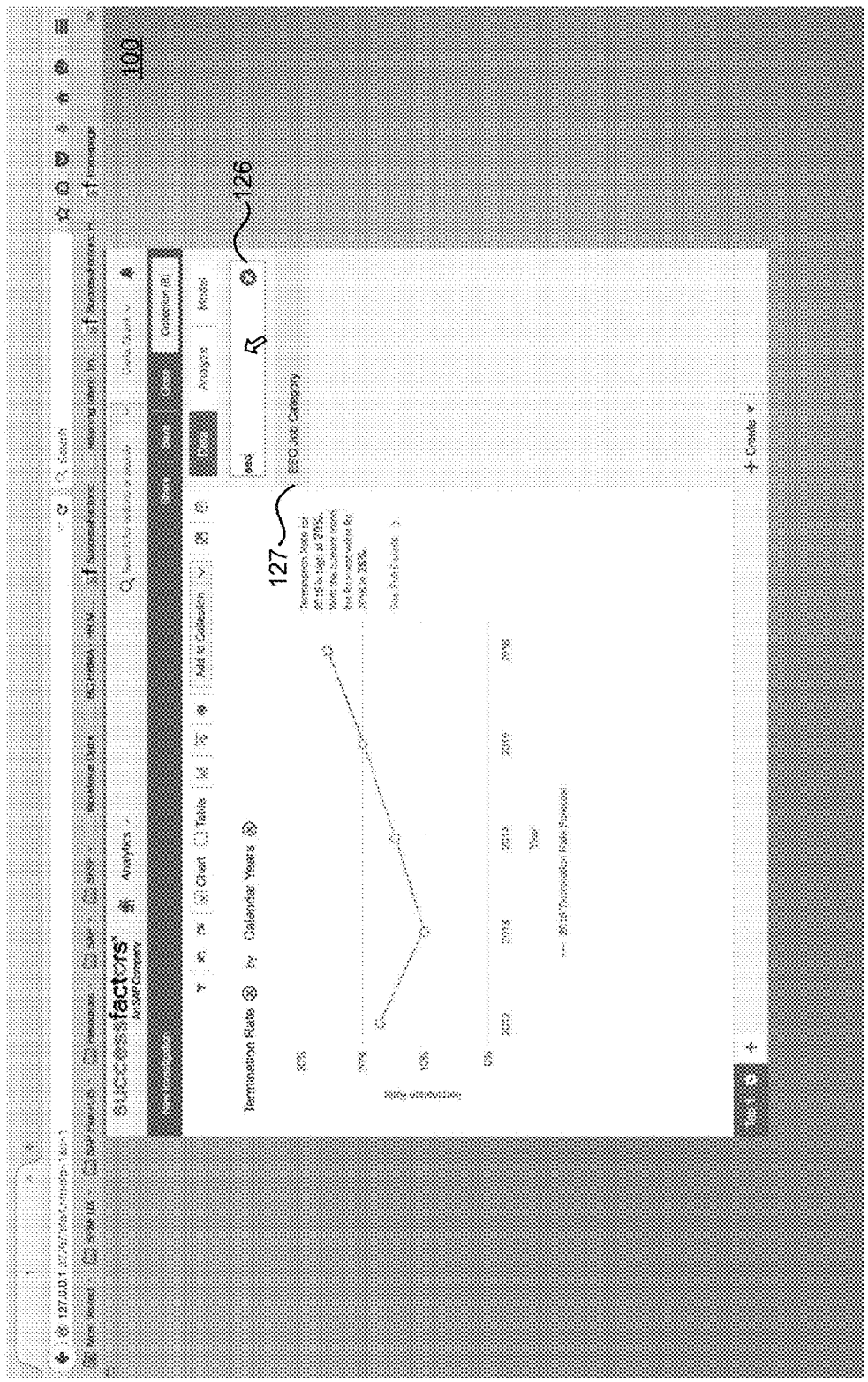

In FIG. 1E, the fifth stage 105 shows the GUI 100 after the user selects the selectable item 125. As shown, the GUI 100 in the fifth stage 105 is displaying a page similar to that shown in FIG. 1D except the tabular visualization 124 is no longer displayed. At the fifth stage 105, the user used the selection tool to select an input control 126 and is providing input in the input control 126. When input is provided in input control 126, the GUI 100 updates the pane below the input control 126 with search results. In this example, the user has entered "eeo" in the input control 126 and the GUI 100 updates the pane below the input control 126 with a selectable item 127 to select an "EEO Job Category" data variable.

Figure 1F:
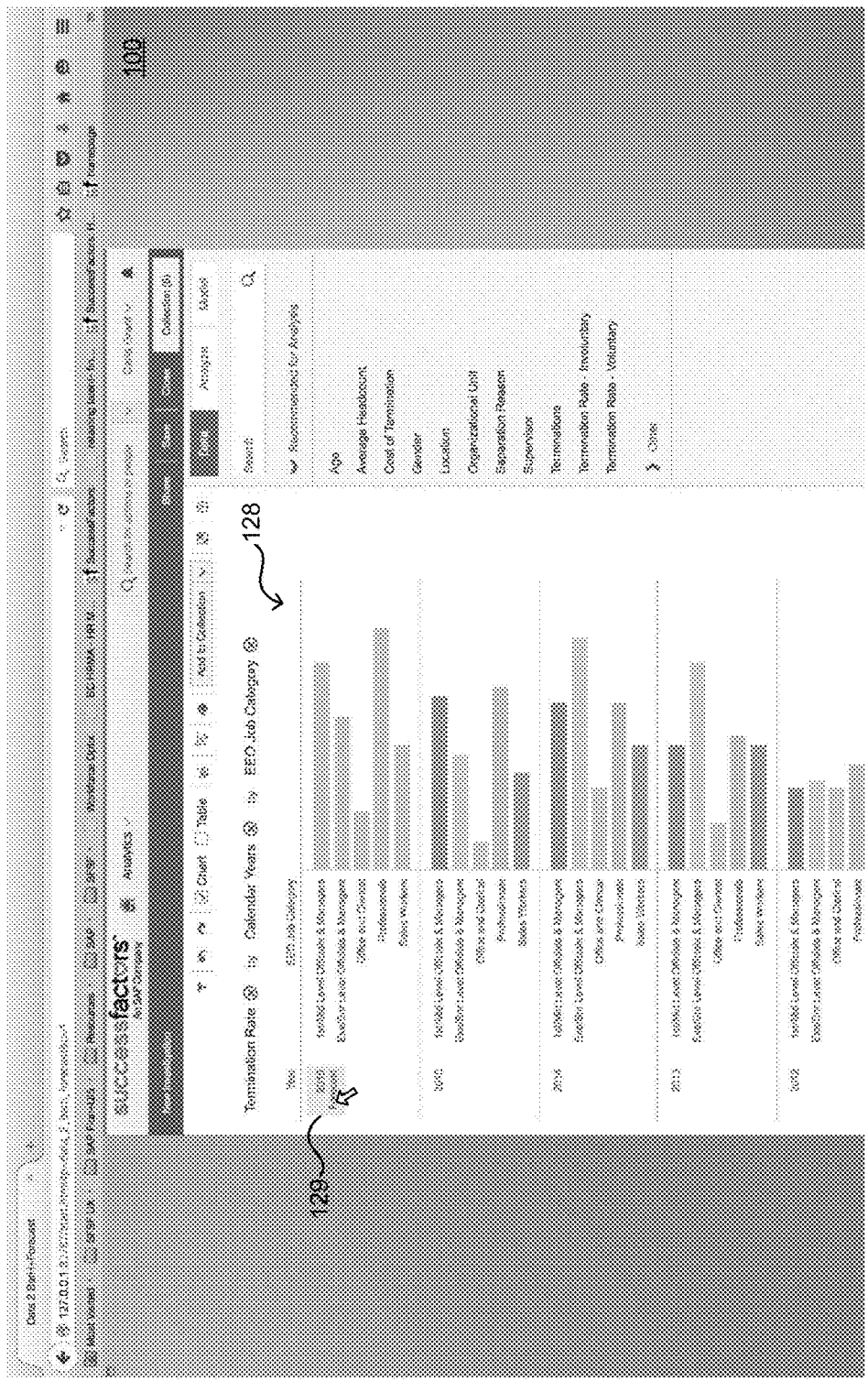

In FIG. 1F, the sixth stage 106 illustrates the GUI 100 after the user selects the selectable item 127. Upon selection of the selectable item 127, the GUI 100 transitions to displaying a page that displays a comparison visualization 128 of the "Termination Rate" and "EEO Job Category" data variables that is automatically generated in response to the additional selection of the "EEO Job Category" data variable. At the sixth stage 106, the user is also using the selection tool to select a selectable item 129. Upon selection of the selectable item 129, the GUI 100 displays a contextual menu associated with "2016 Forecast" data.

Figure 1G:
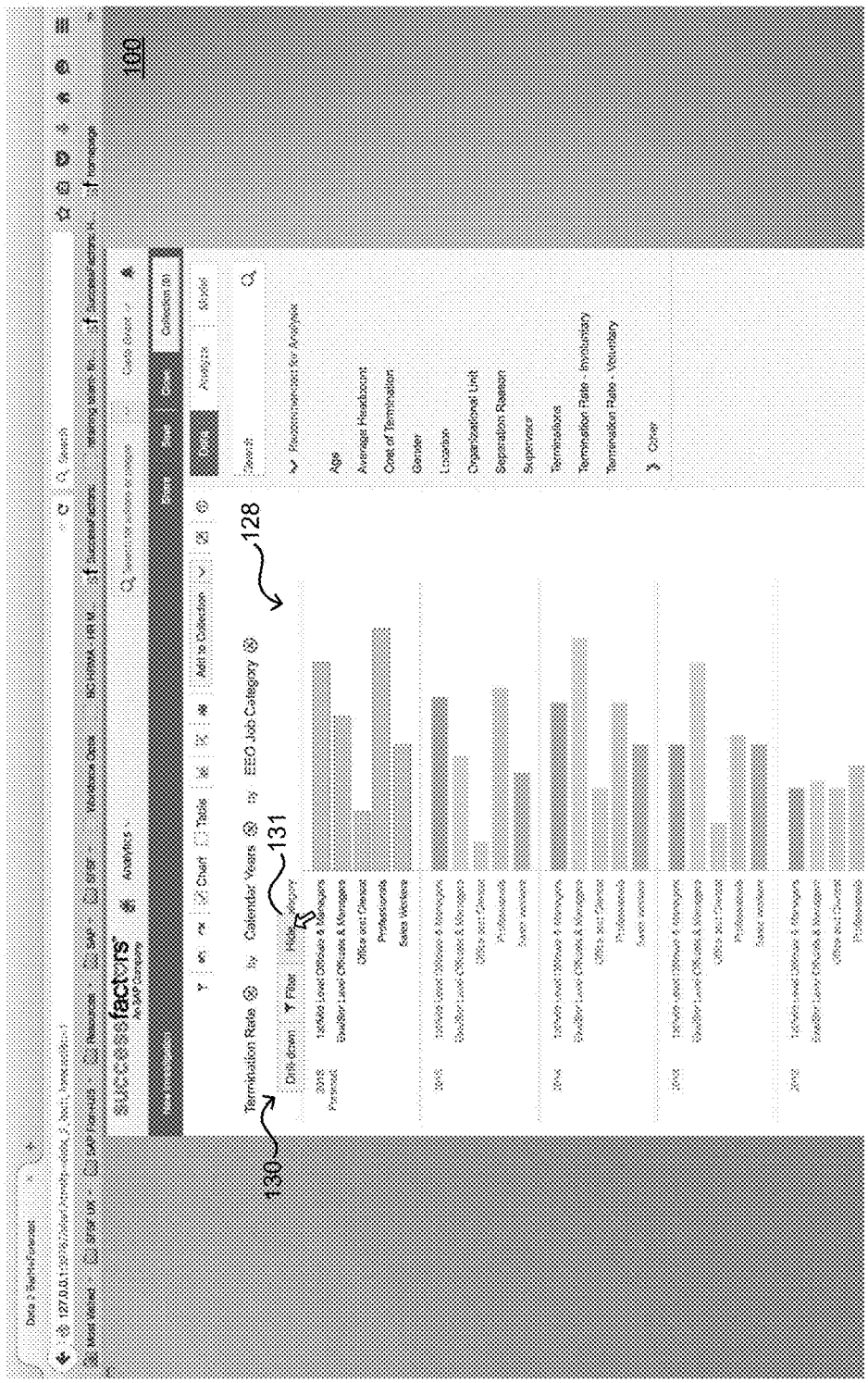

In FIG. 1G, the seventh stage 107 shows the GUI 100 after the user selects the selectable item 129. As shown, the GUI 100 in the seventh stage 107 is displaying the page shown in FIG. 1F as well as a contextual menu 130 that includes a selectable item 131. The seventh stage 107 also illustrates the user using the selection tool to select the selectable item 131. Upon selection of the selectable item 131, the GUI 100 transitions to displaying the comparison visualization 128 illustrated in FIG. 1G without "2016 Forecast" data.

Figure 1H:
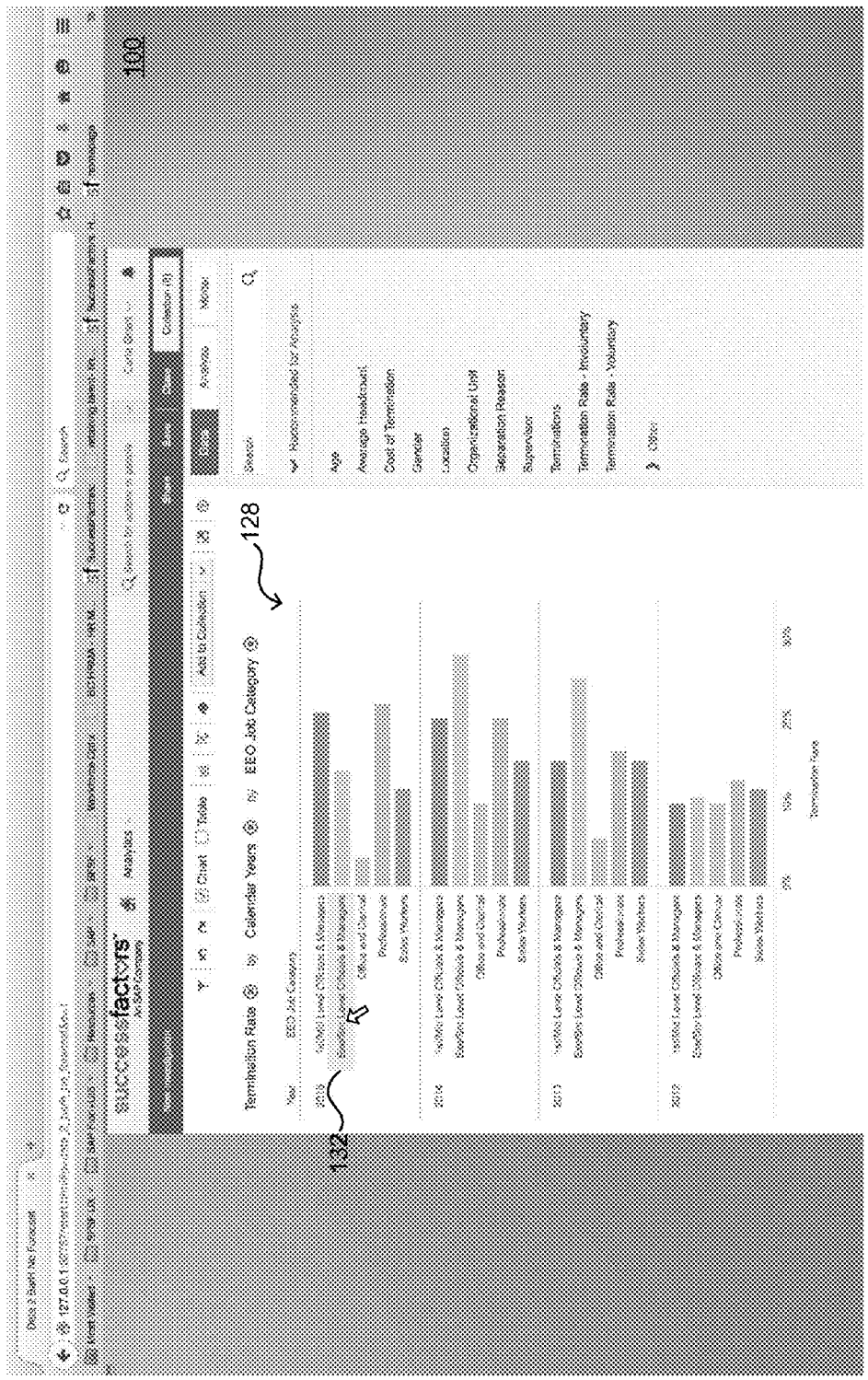

In FIG. 1H, the eighth stage 108 illustrates the GUI 100 after the user selects the selectable item 131. As shown, the comparison visualization 128 illustrated in FIG. 1G no longer includes "2016 Forecast" data. At the eighth stage 108, the user is also using the selection tool to select a selectable item 132. Upon selection of the selectable item 132, the GUI 100 displays a contextual menu associated with "Exe/Snr Level Officials & Managers" data.

Figure 1I:
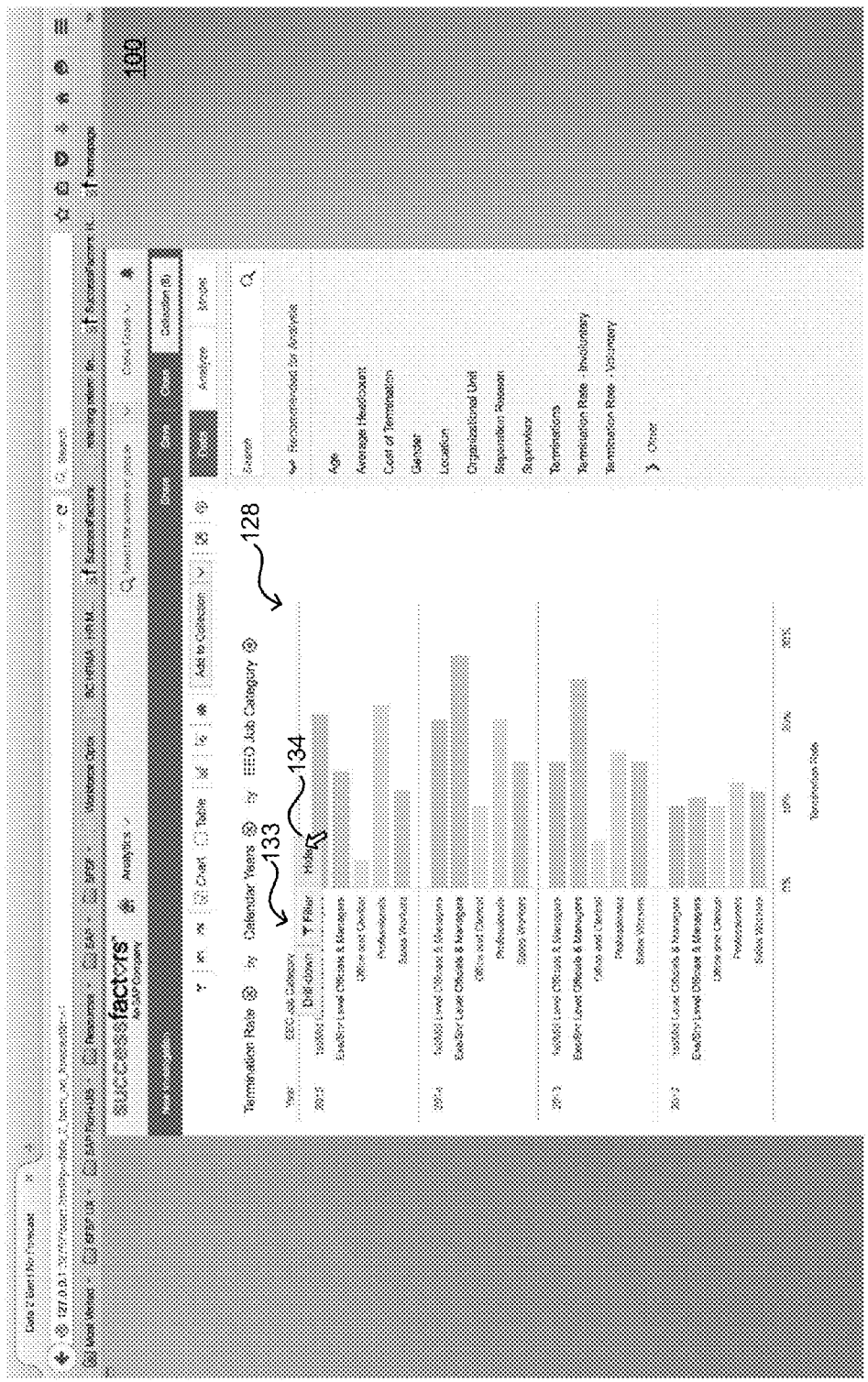

In FIG. 1I, the ninth stage 109 shows the GUI 100 after the user selects the selectable item 132. As shown, the GUI 100 in the ninth stage 109 is displaying the page shown in FIG. 1H as well as a contextual menu 133 that includes a selectable item 134. The ninth stage 109 also illustrates the user using the selection tool to select the selectable item 134. Upon selection of the selectable item 134, the GUI 100 transitions to displaying the comparison visualization 128 illustrated in FIG. 1I without "Exe/Snr Level Officials & Managers" data.

Figure 1J:
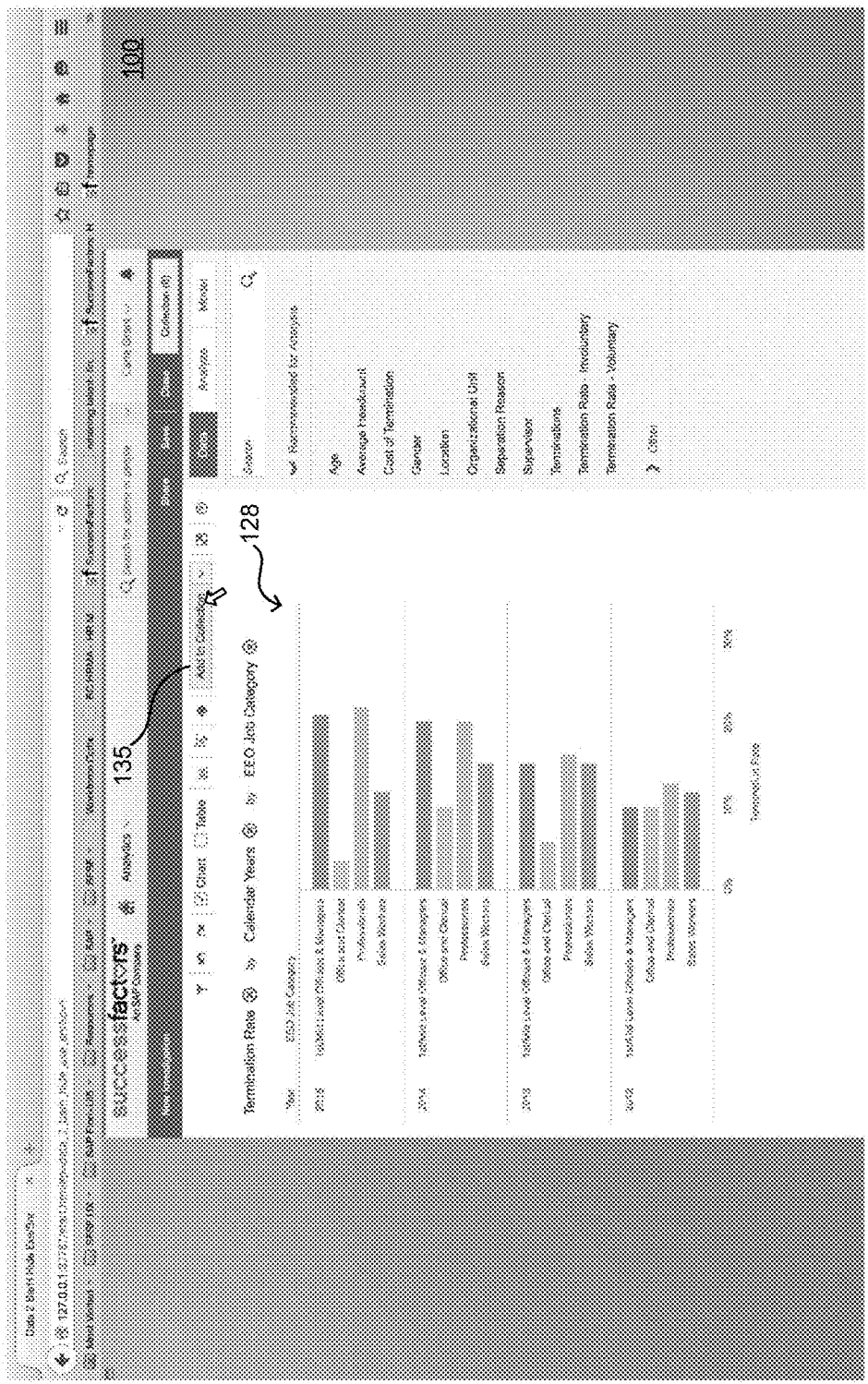

In FIG. 1J, the tenth stage 110 illustrates the GUI 100 after the user selects the selectable item 134. As shown, the comparison visualization 128 illustrated in FIG. 1I no longer includes "Exe/Snr Level Officials & Managers" data. The tenth stage 110 also illustrates the user using the selection tool to select a selectable item 135. Upon selection of the selectable item 135, the GUI 100 displays a page for adding the comparison visualization 128 to a collection.

Figure 1K:
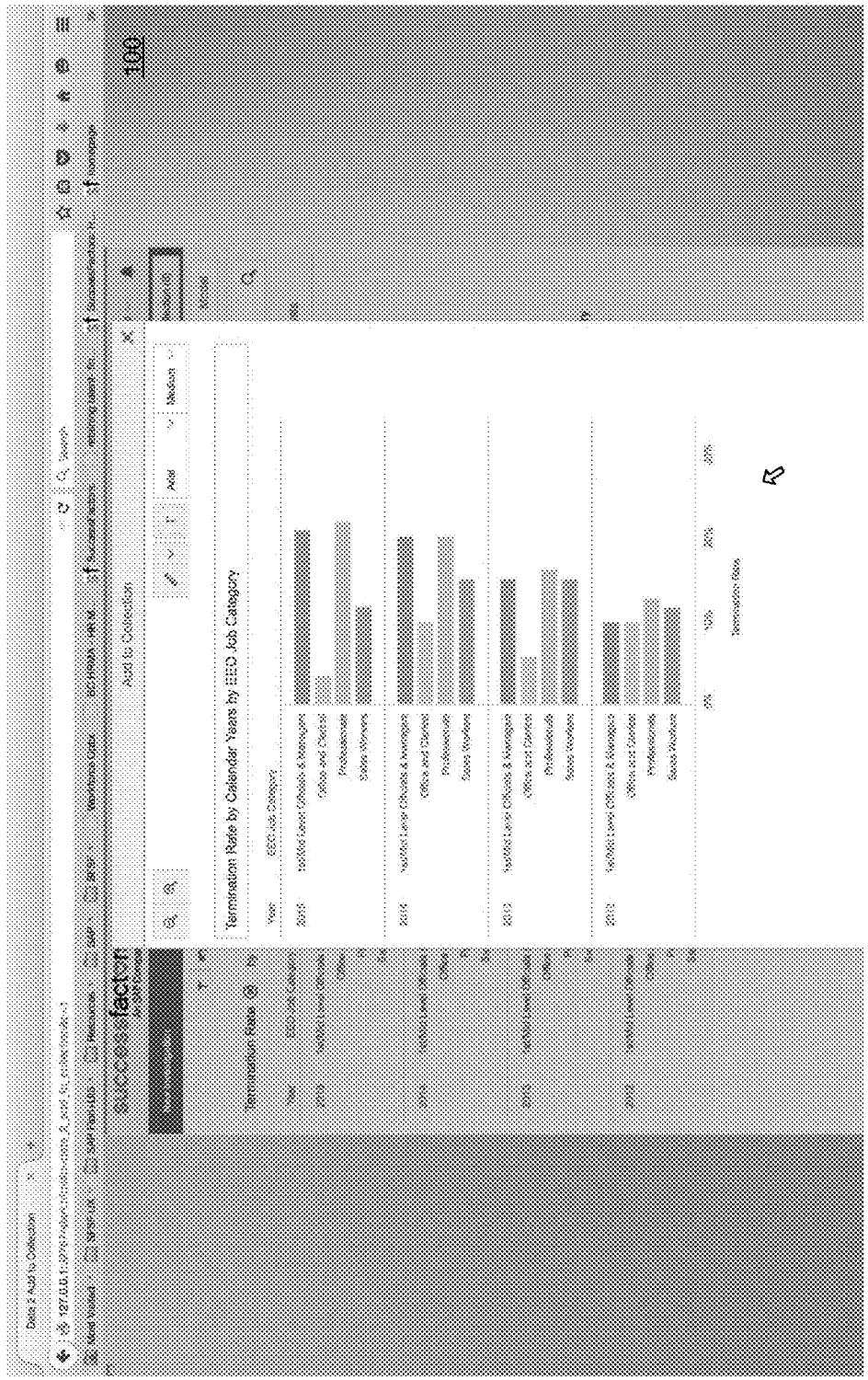

In FIG. 1K, the eleventh stage 111 shows the GUI 100 after the user selects the selectable item 135. As shown, the GUI 100 in the eleventh stage 111 is overlaying a page displaying a preview of a visualization (e.g., the comparison visualization 128 in this example) to be added to the collection.

Figure 1L:
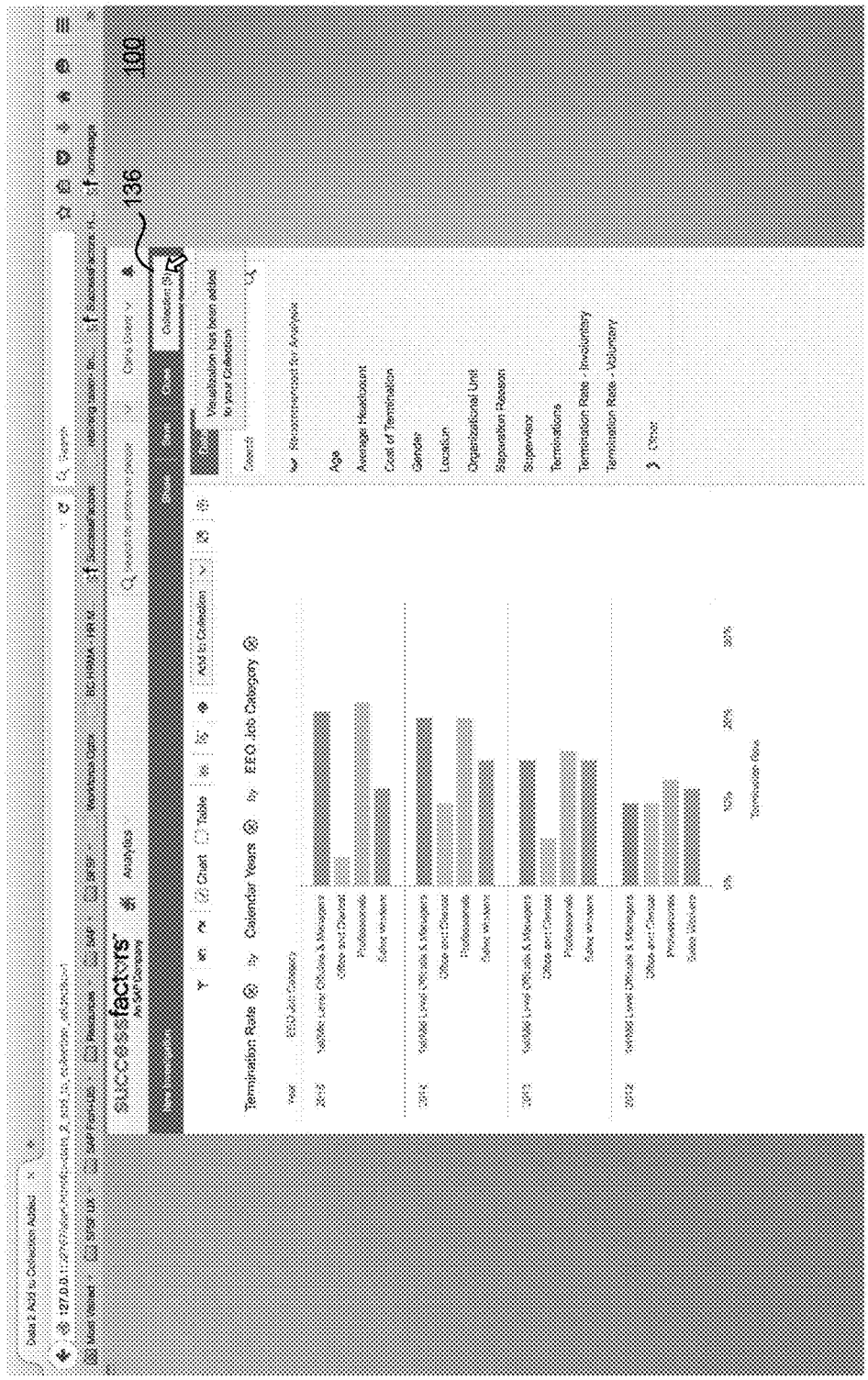

In FIG. 1L, the twelfth stage 112 illustrates the GUI 100 after the user selects a selectable item (not shown) for adding (e.g., storing and/or associating) the visualization shown in FIG. 1K to the collection. Upon selection of the selectable item for adding the visualization to the collection, the GUI 100 closes the overlaid page illustrated in FIG. 1K and transitions to displaying the GUI 100 shown in FIG. 1J. At the twelfth stage 112, the user is also using the selection tool to select a selectable item 136. Upon selection of the selectable item 136, the GUI 100 overlays a page of recently added visualizations to the collection.

Figure 1M:
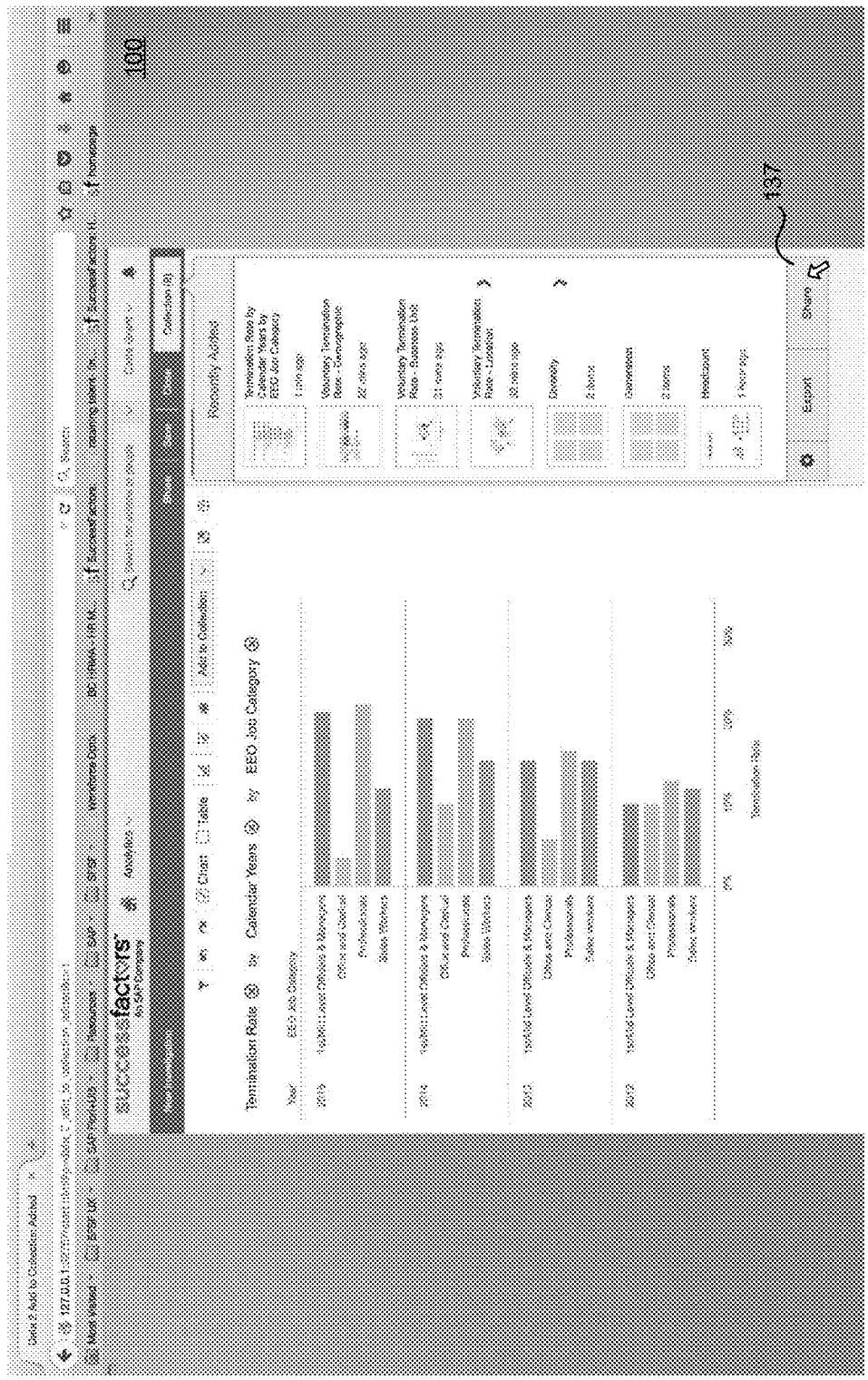

In FIG. 1M, the thirteen stage 113 shows the GUI 100 after the user selects the selectable item 136. As shown, the GUI 100 in the thirteenth stage 113 is overlaying a page displaying a list of visualizations that have been added to the collection. The thirteenth stage 113 also illustrates the user using the selection tool to select a selectable item 137. Upon selection of the selectable item 137, the GUI 100 overlays a page for sharing visualizations in the collection.

Figure 1N:
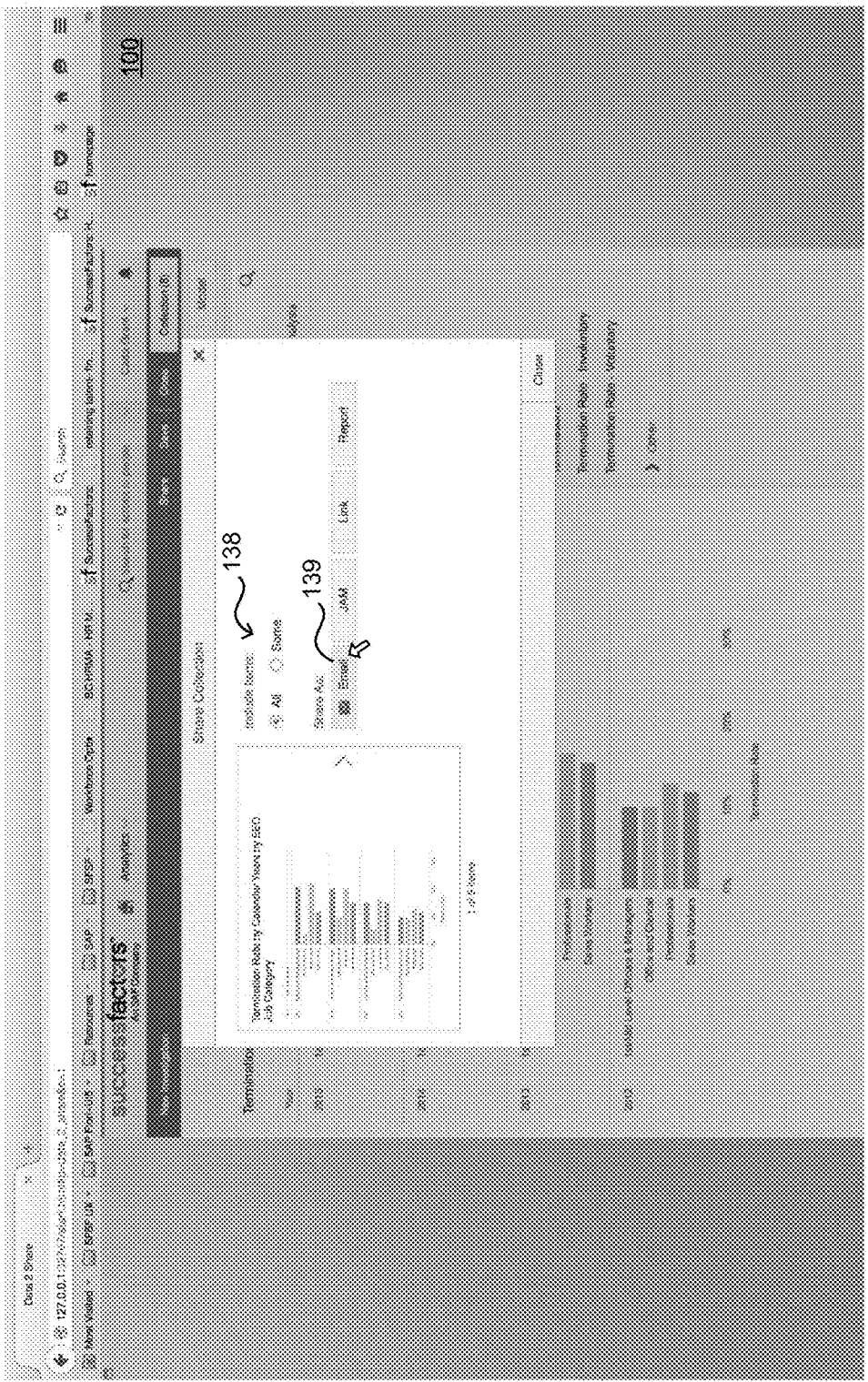
Figure 10:
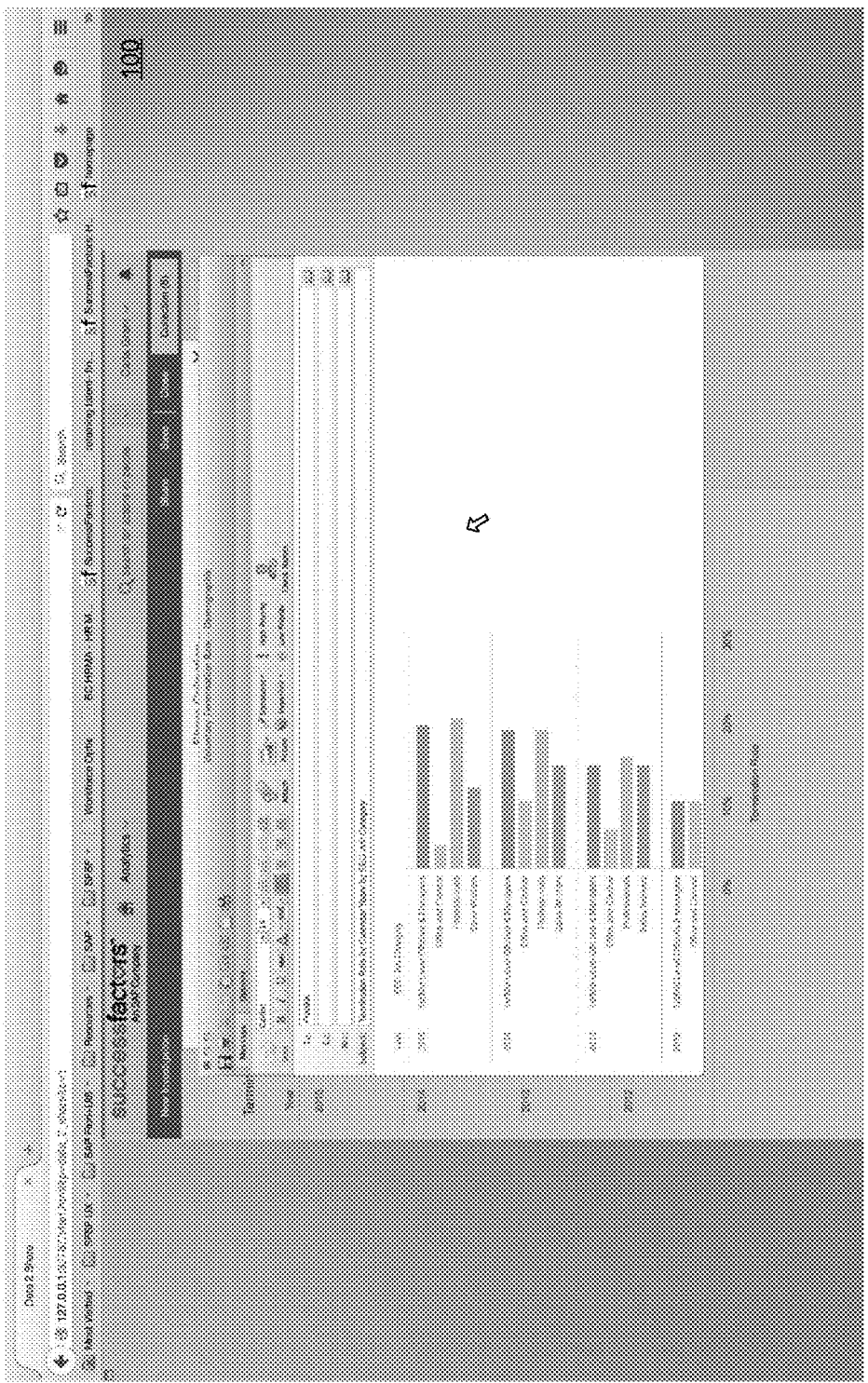

In FIG. 1N, the fourteenth stage 114 illustrates the GUI 100 after the user selects the selectable item 137. As shown, the GUI 100 in the fourteenth stage 114 is overlaying a page for sharing visualizations in the collection that includes a radio control 138 for selecting some or all visualizations in the collection and a selectable item 139 for sharing the selected visualizations in the collection via electronic mail.

In FIG. 1O, the fifteenth stage 115 shows the GUI 100 after the user selects the comparison visualization 128 in the collection for sharing via electronic mail (e.g., by selecting the "Some" option in the radio control 138, selecting a visual representation (e.g., an icon, a thumbnail, etc.) of the comparison visualization 128, and selecting selectable item 139).

Figure 2A:
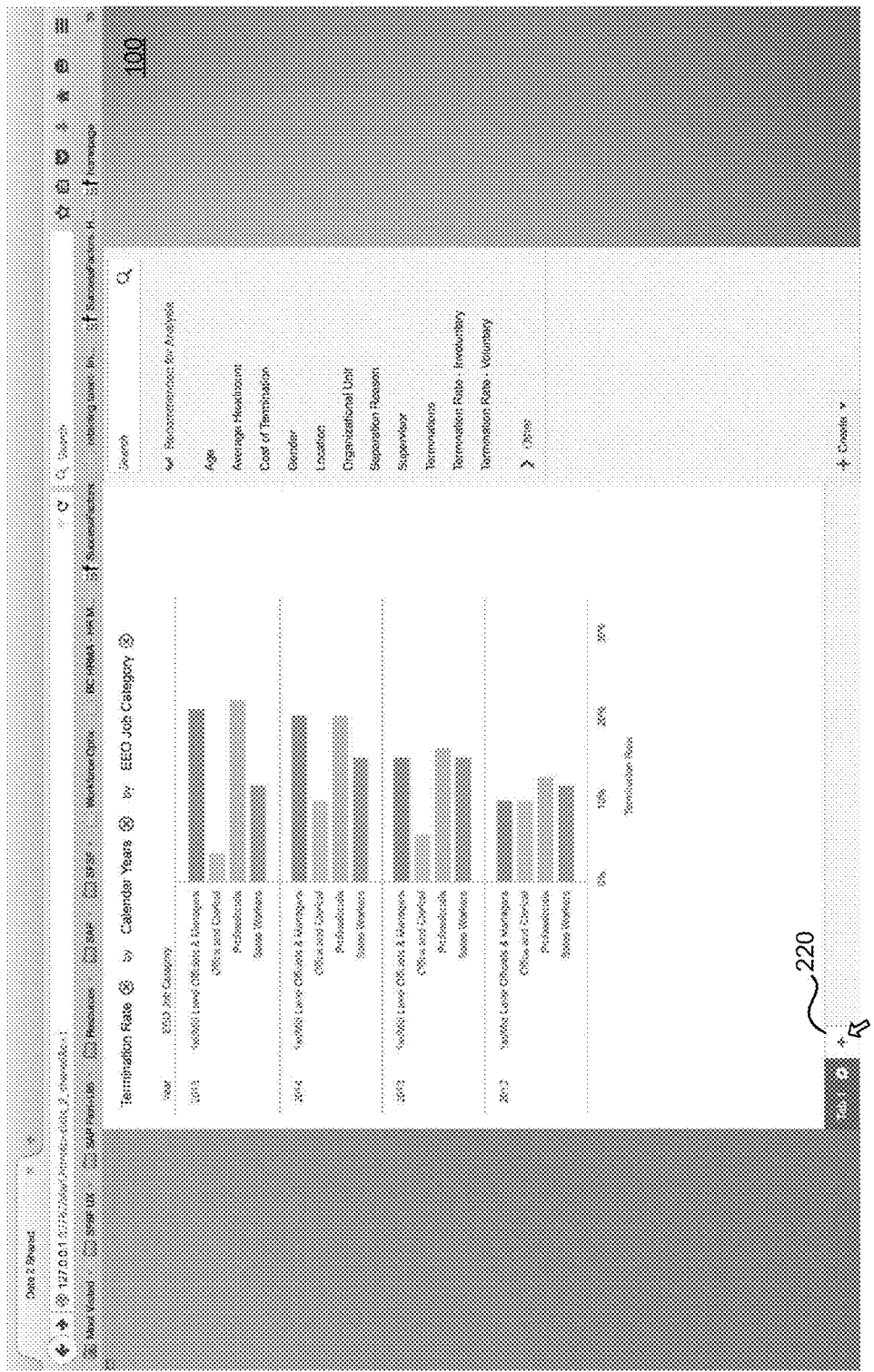
FIGS. 2A-2S illustrate a tool for automatically generating tabular visualizations according to some embodiments according to some embodiments.
Figure 2B:
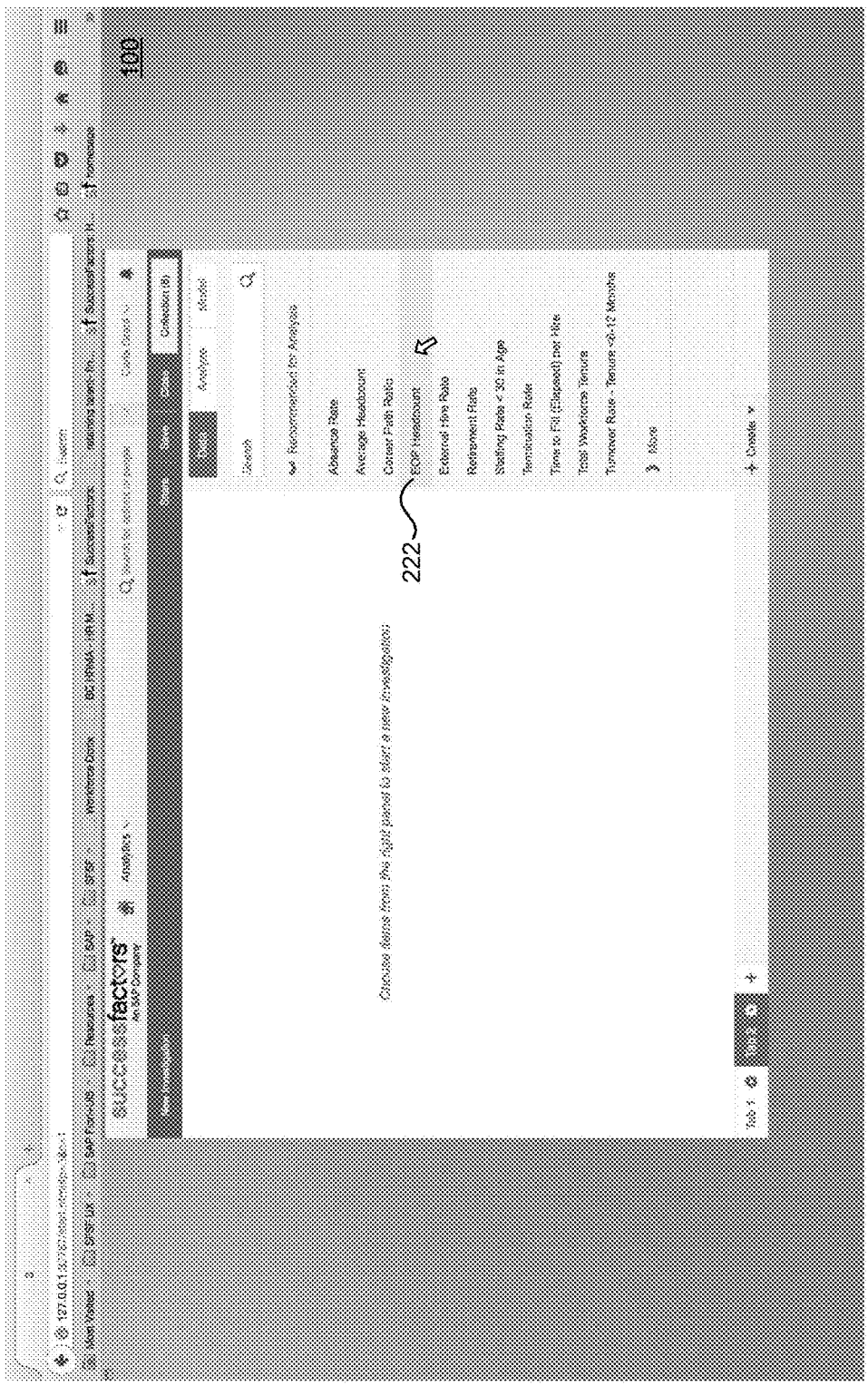
Figure 2C:
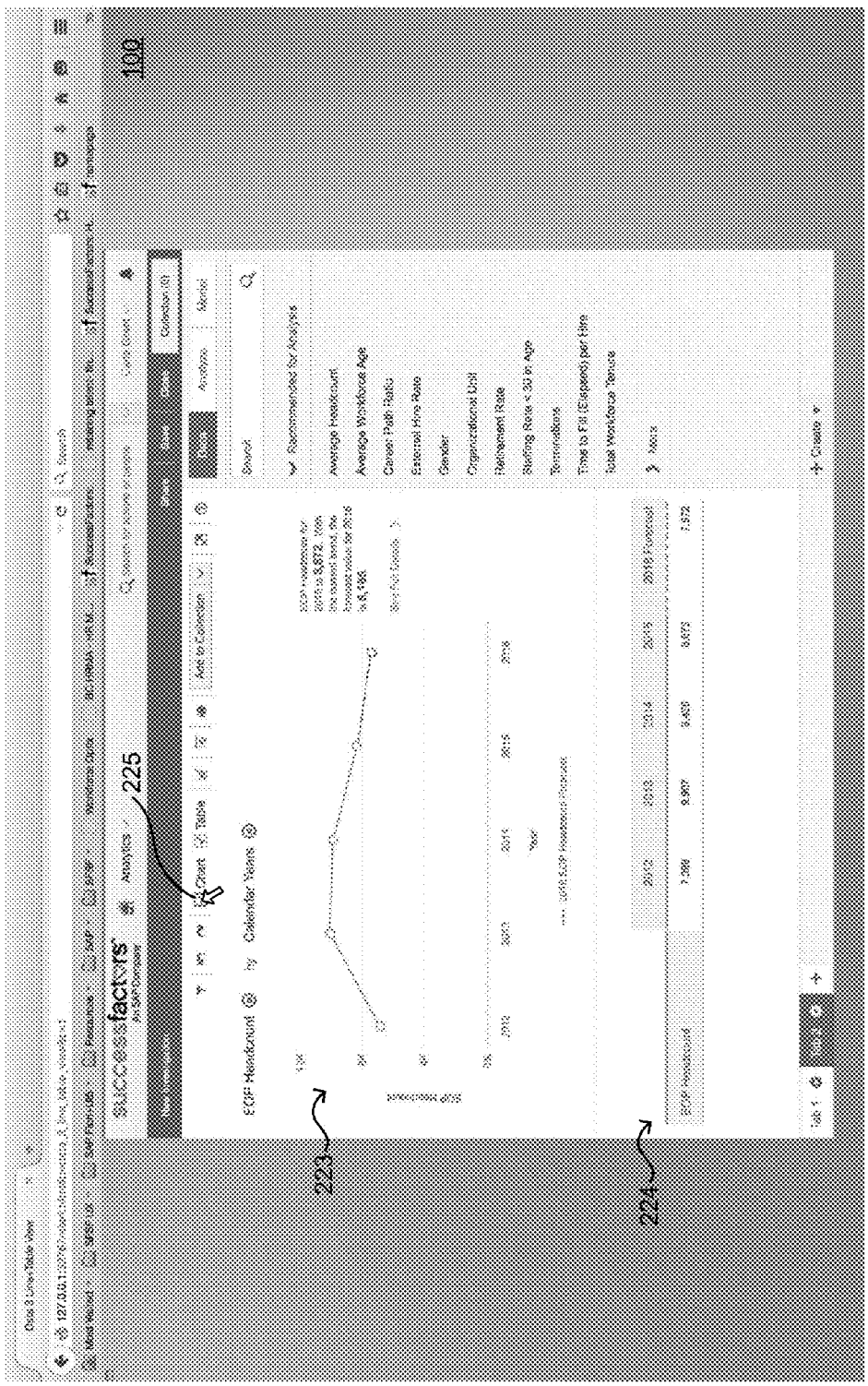
Figure 2D:
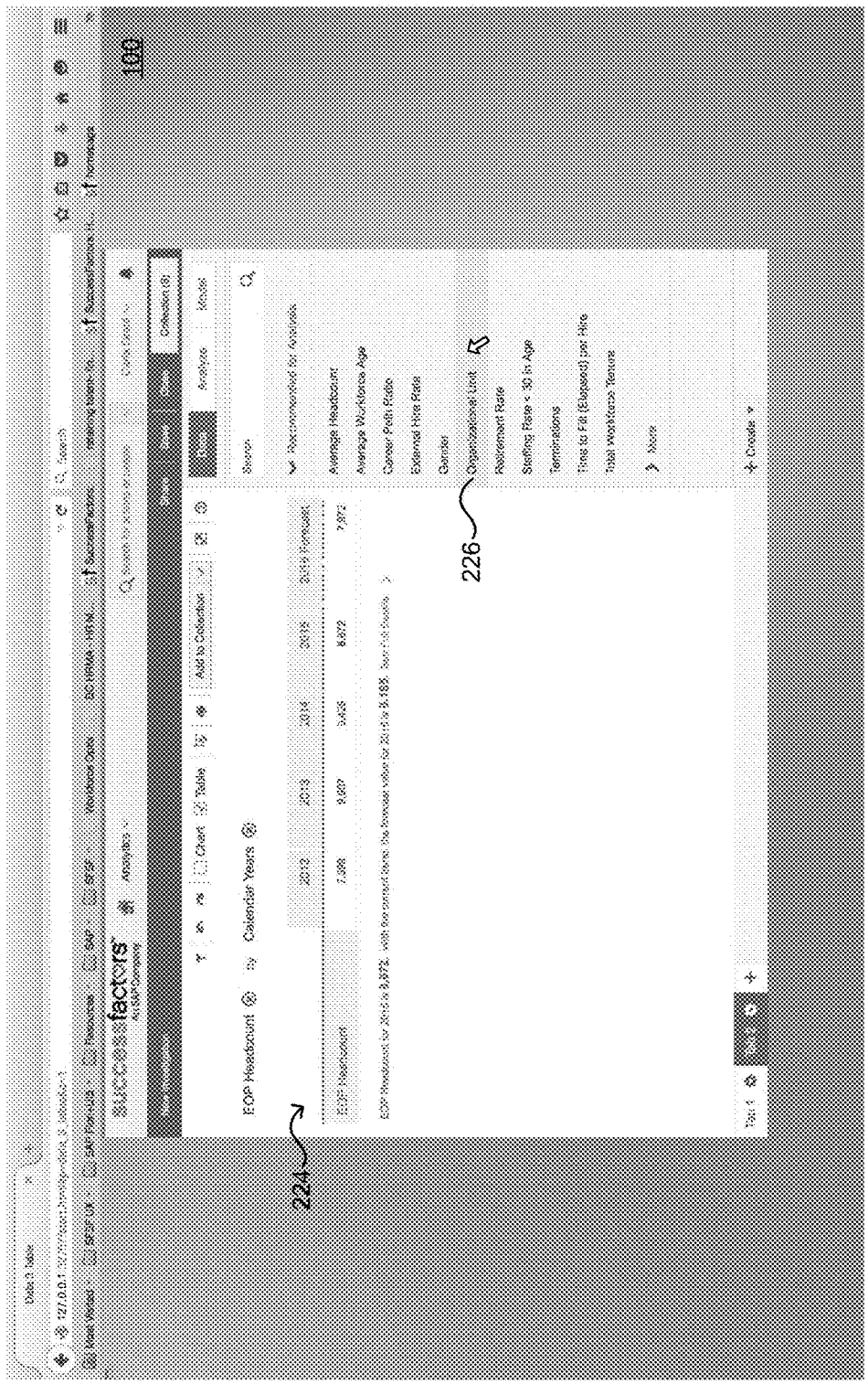
Figure 2E:
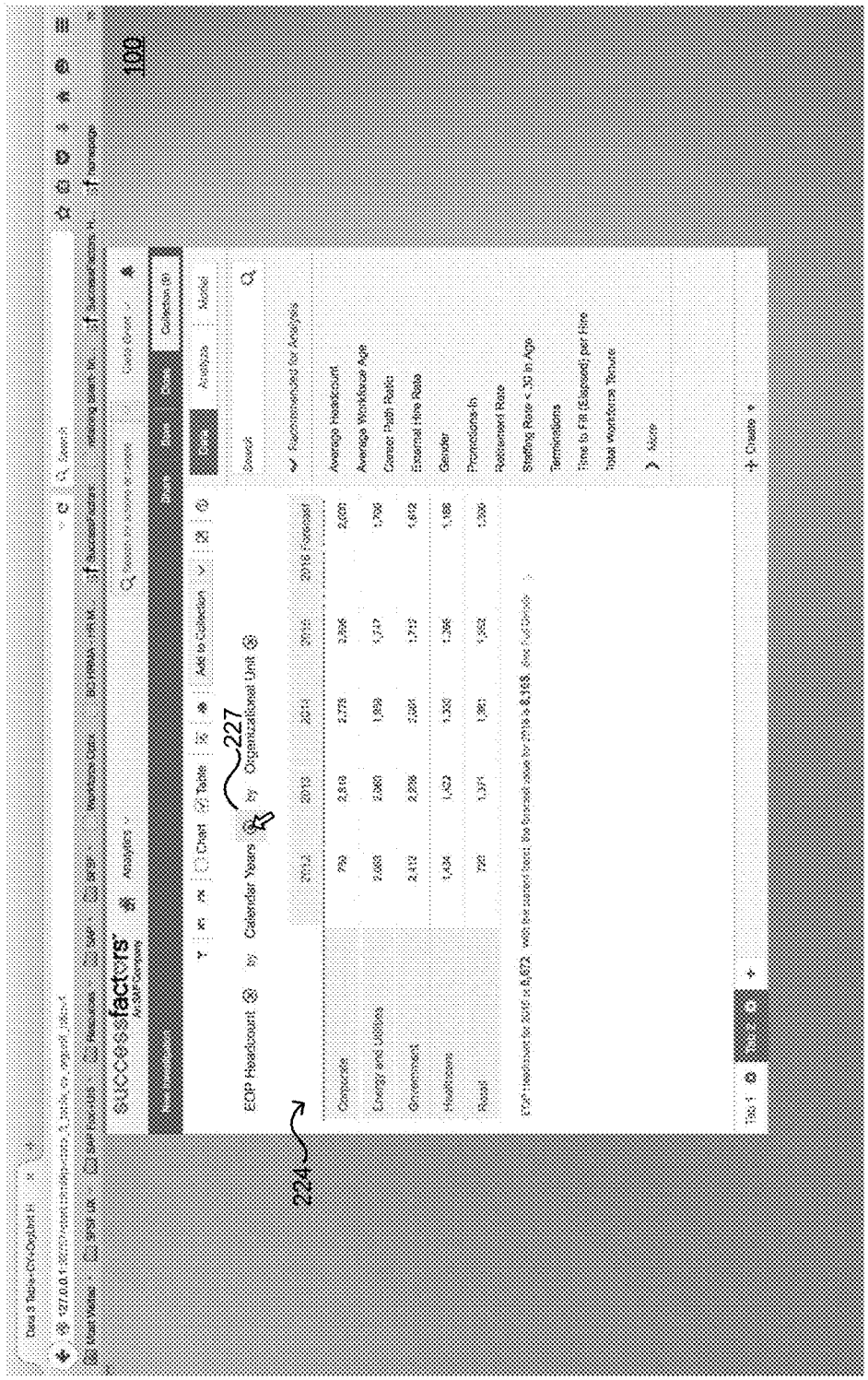
Figure 2F:
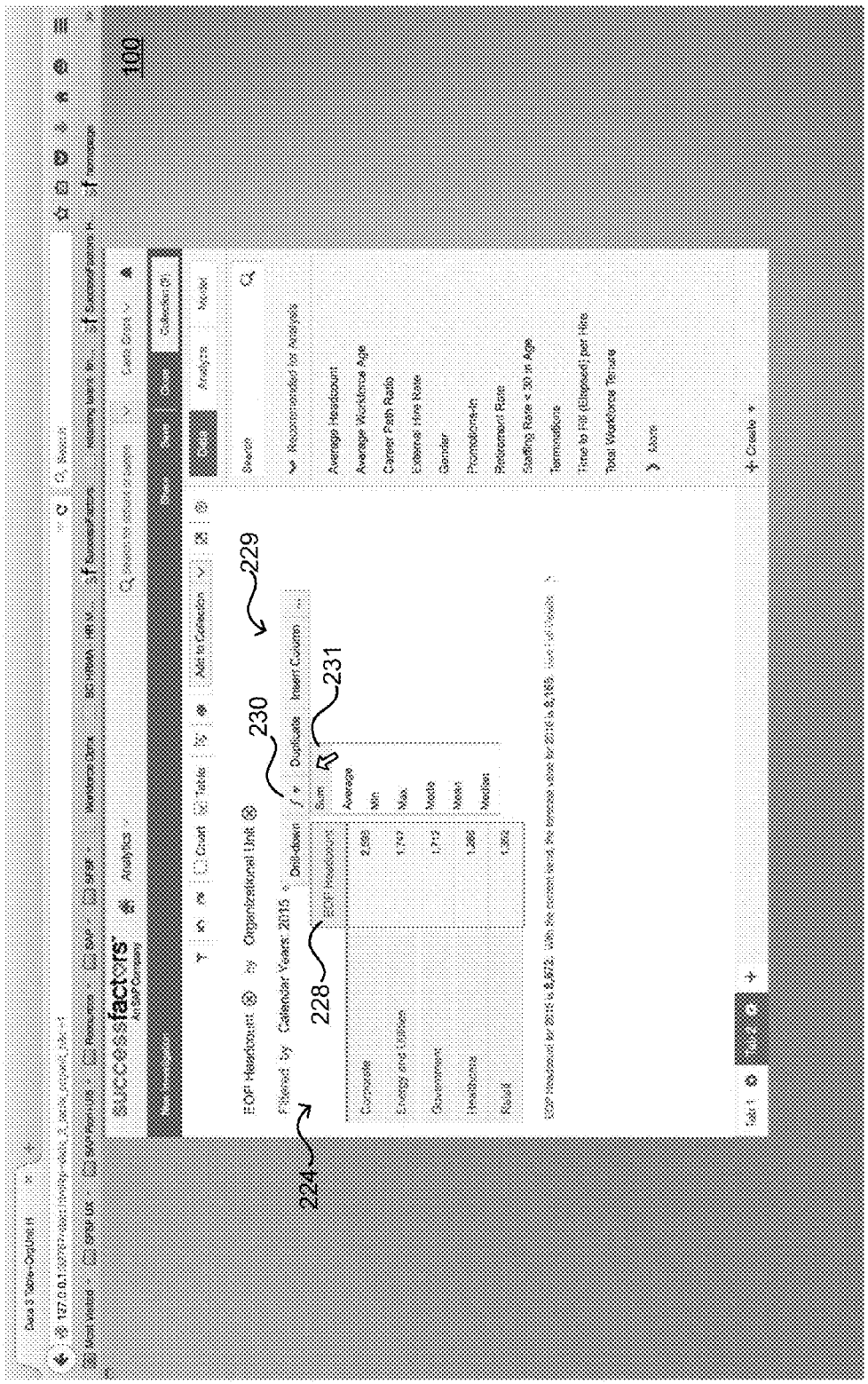
Figure 2G:
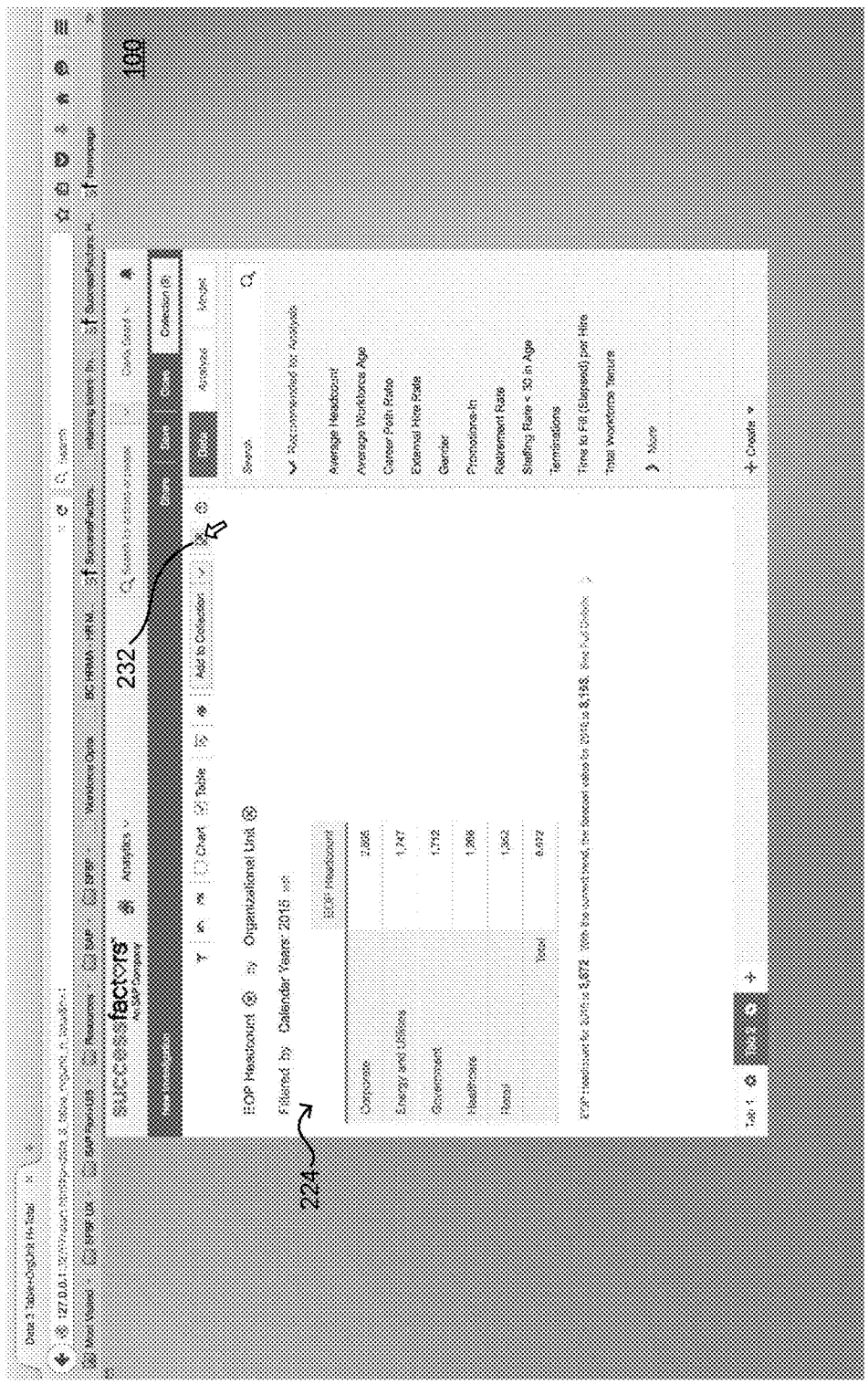
Figure 2H:
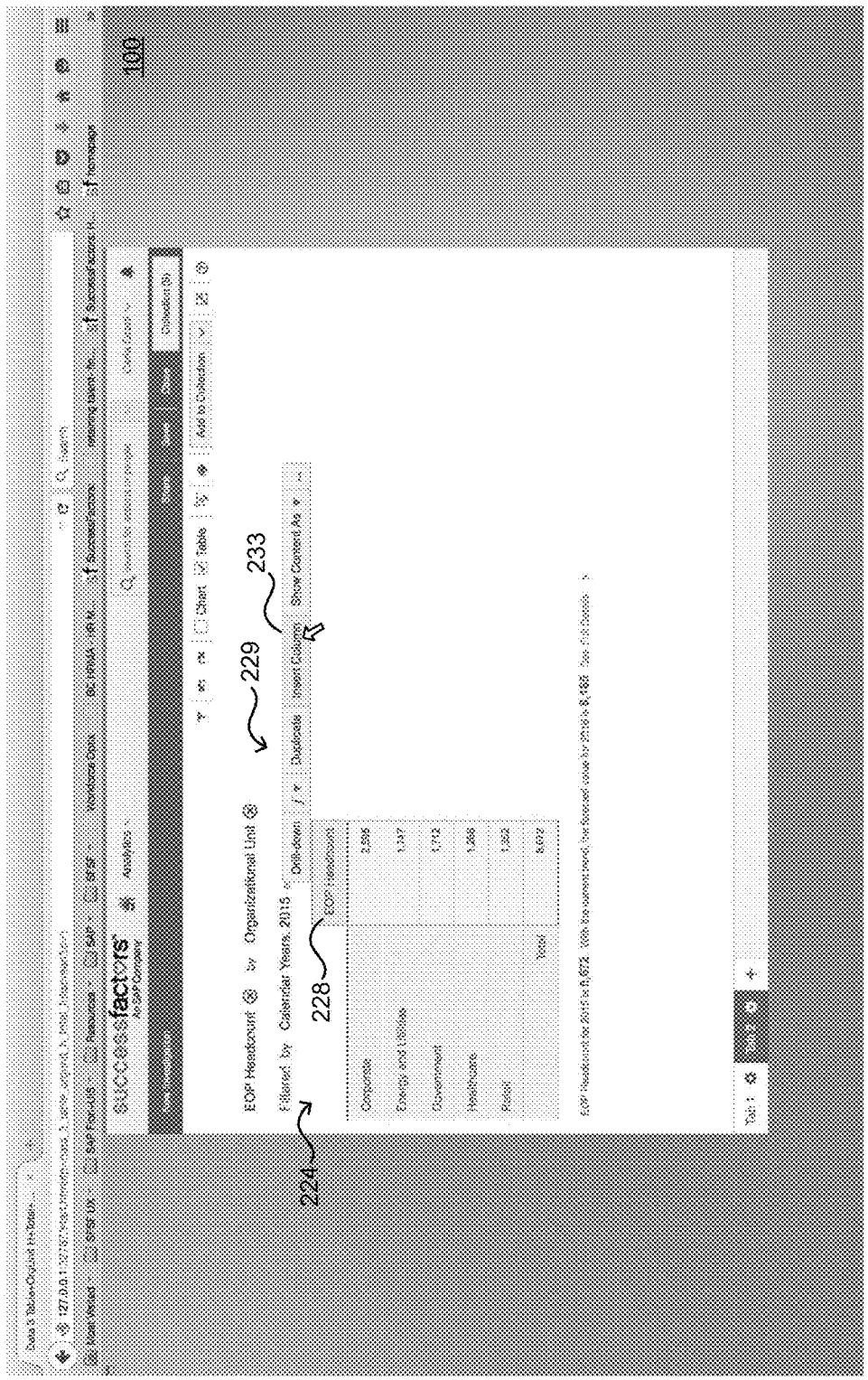
Figure 2I:
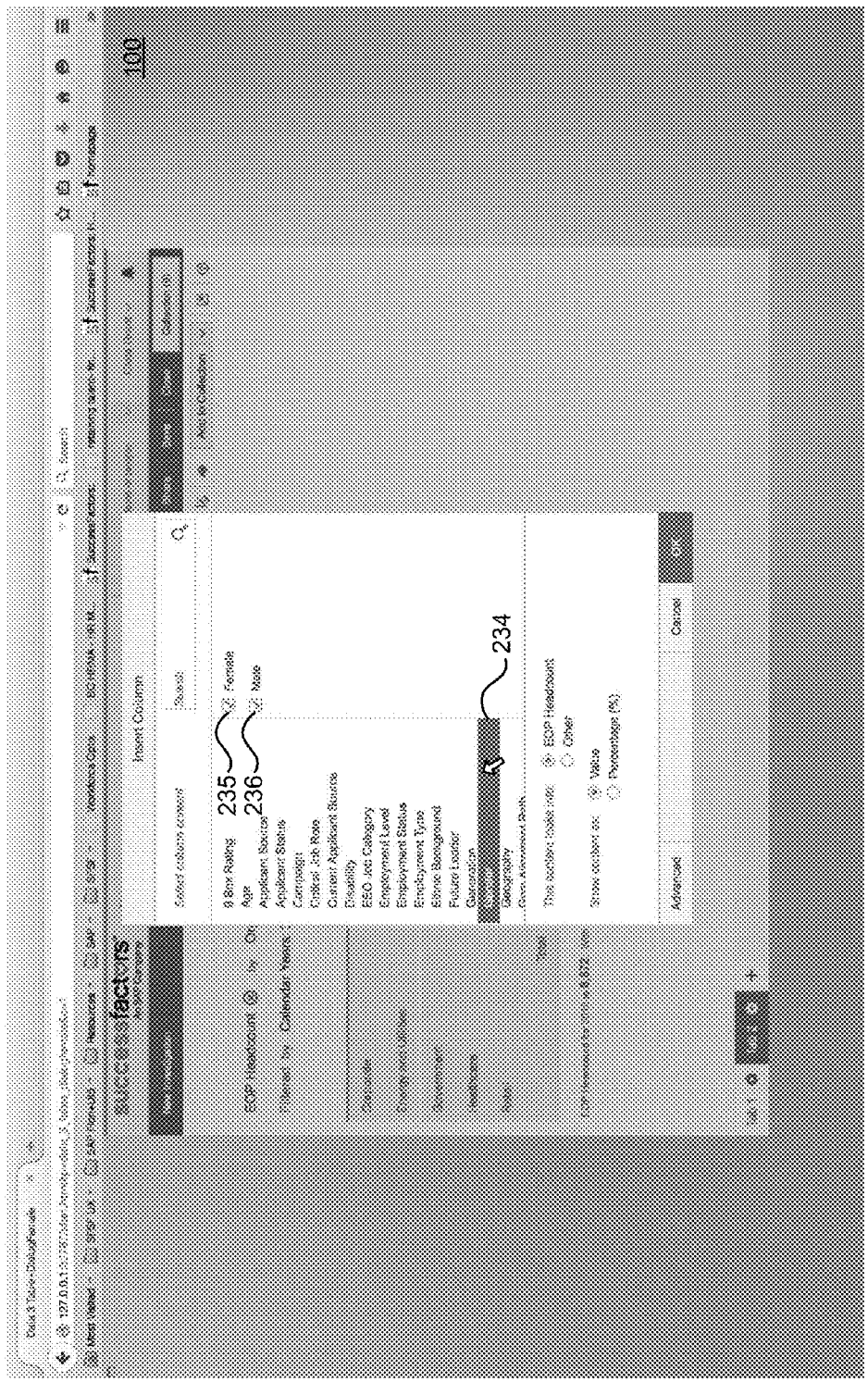
Figure 2J:
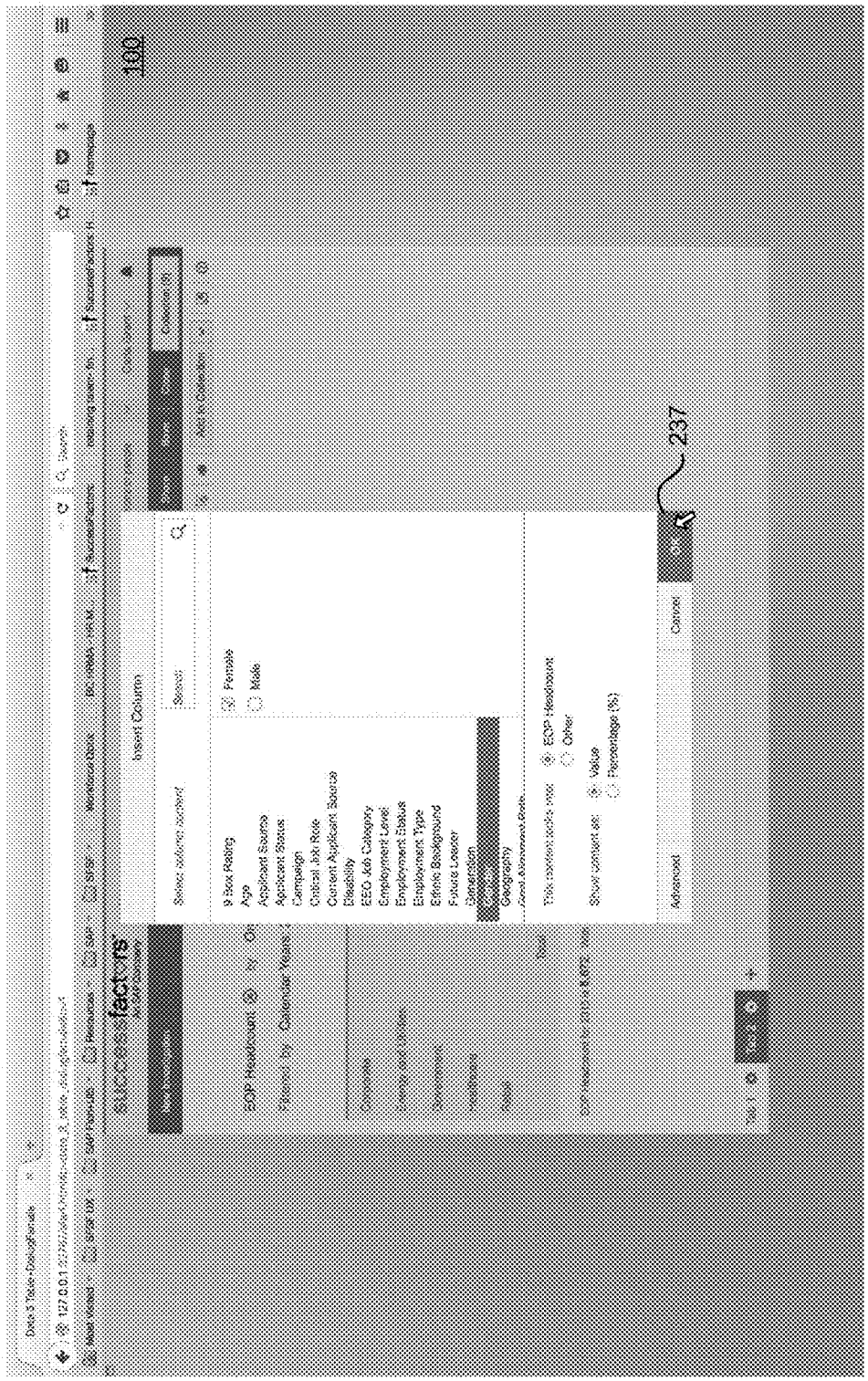
Figure 2K:
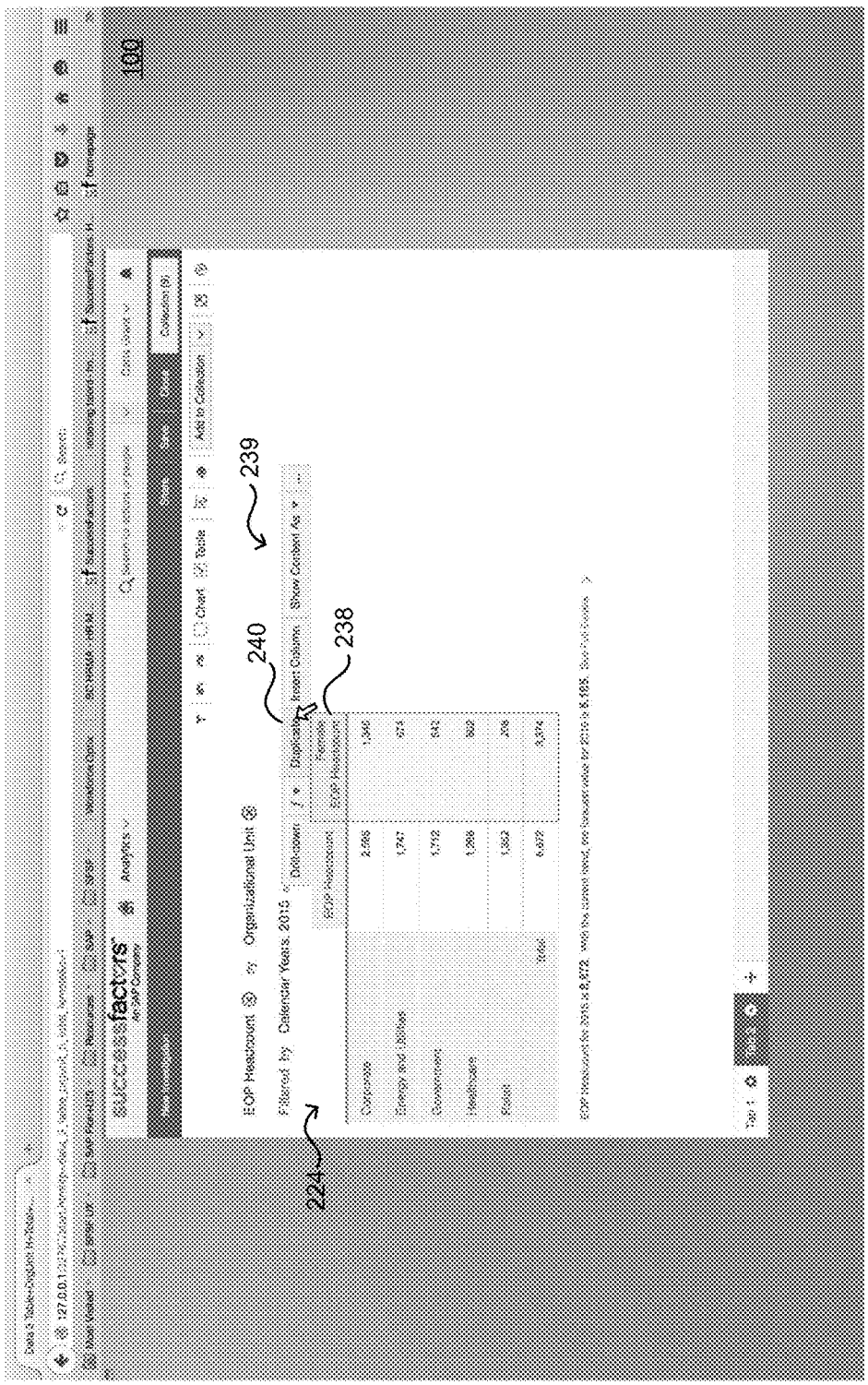
Figure 2L:
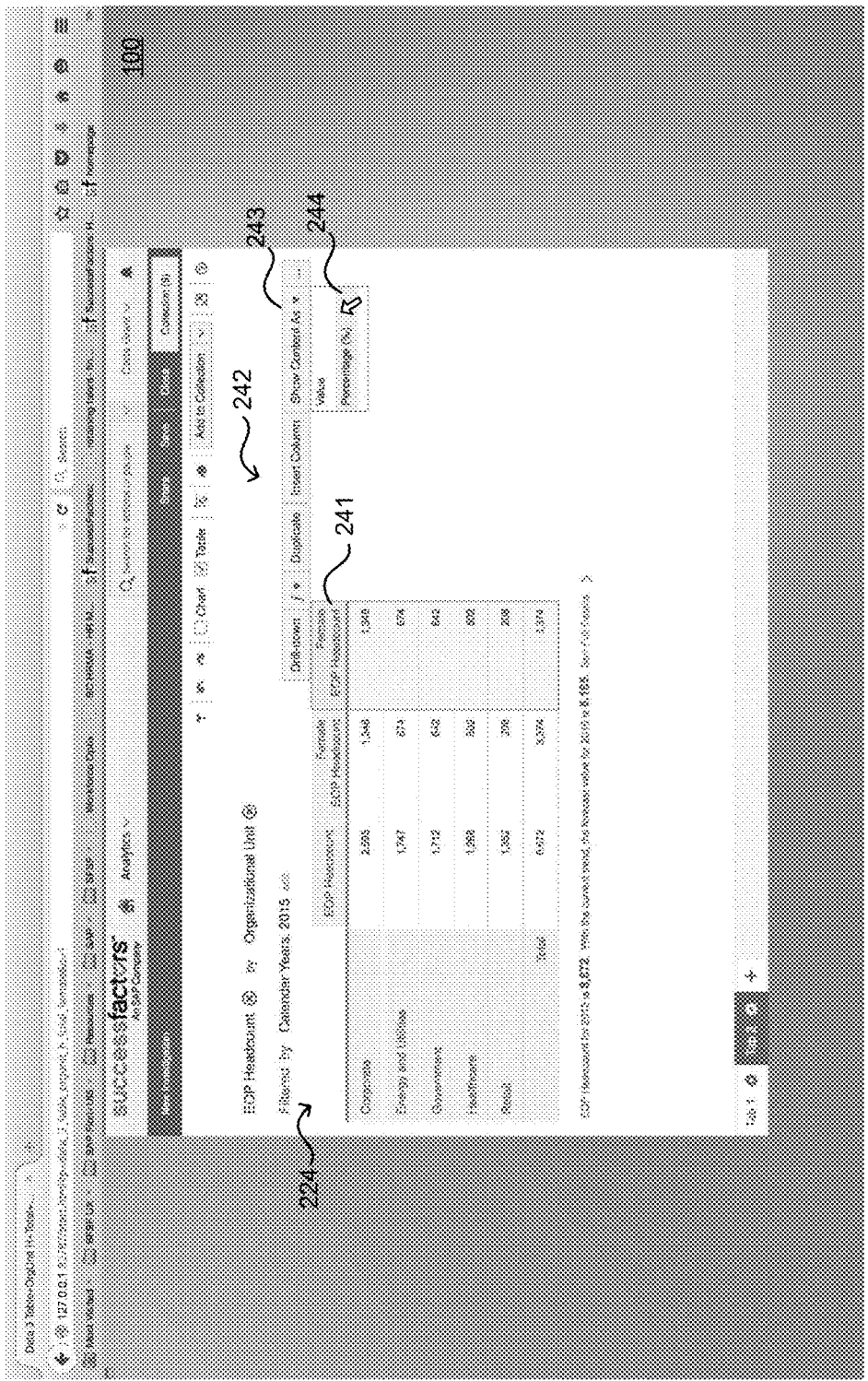
Figure 2M:
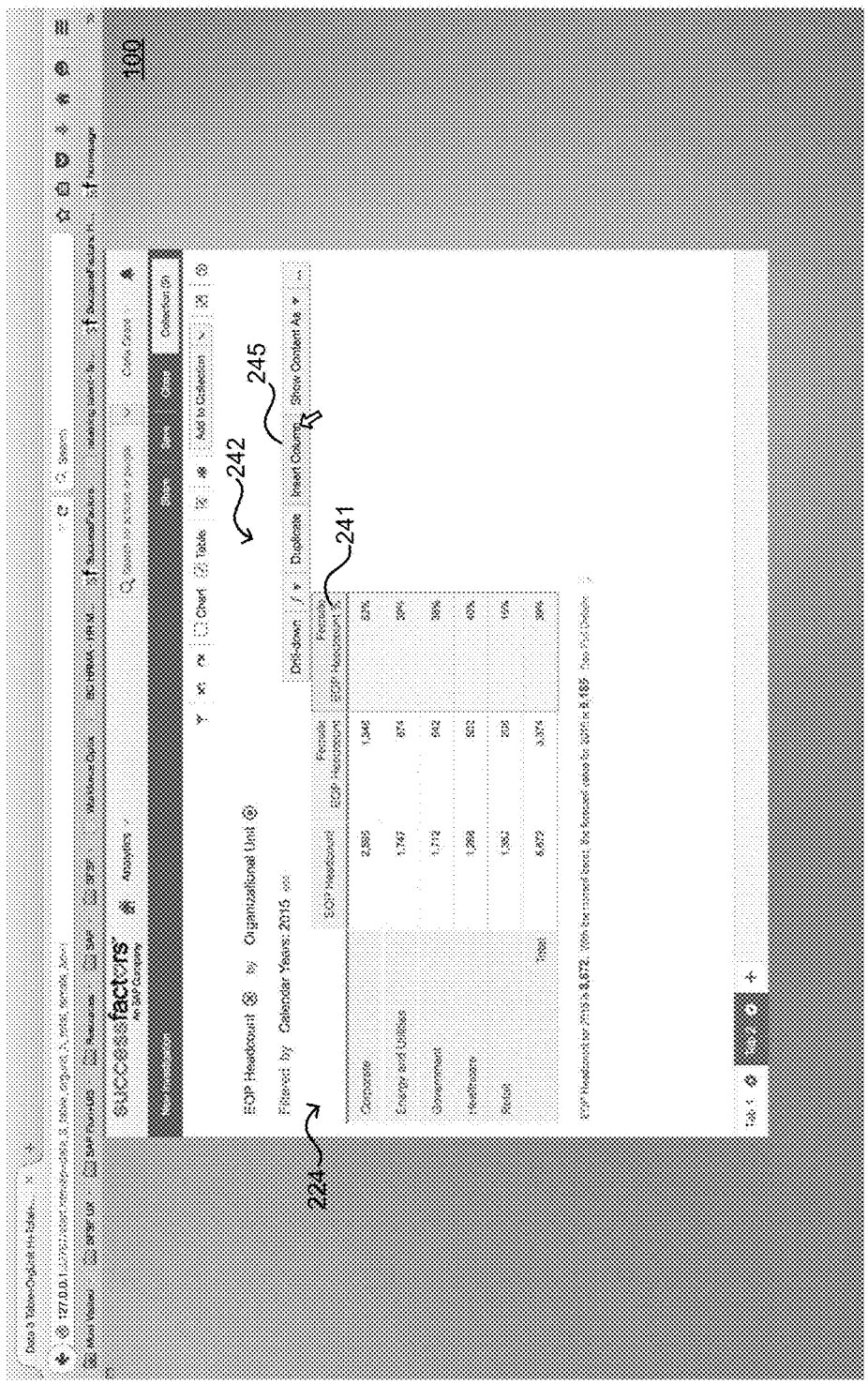
Figure 2N:
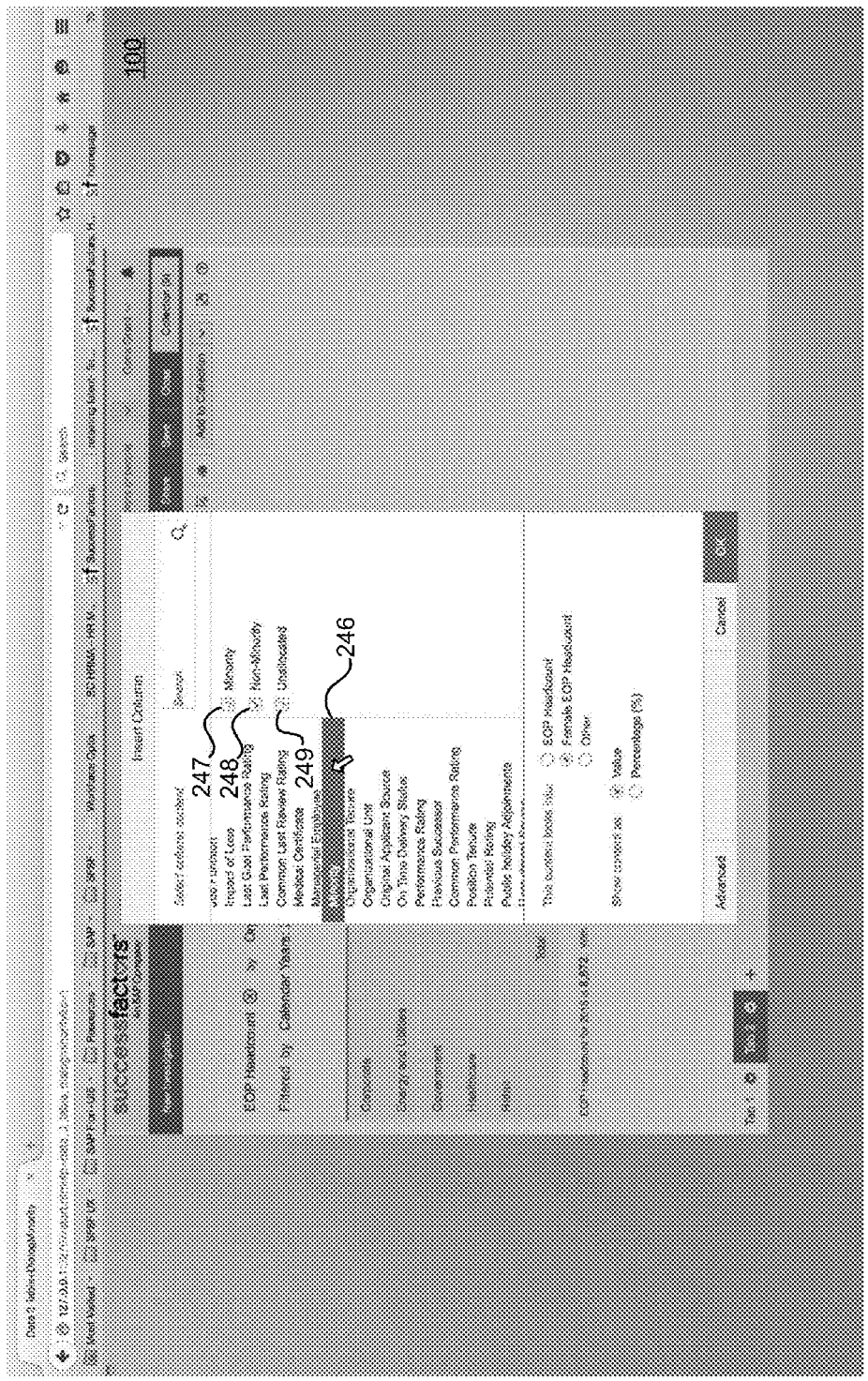
Figure 2O:
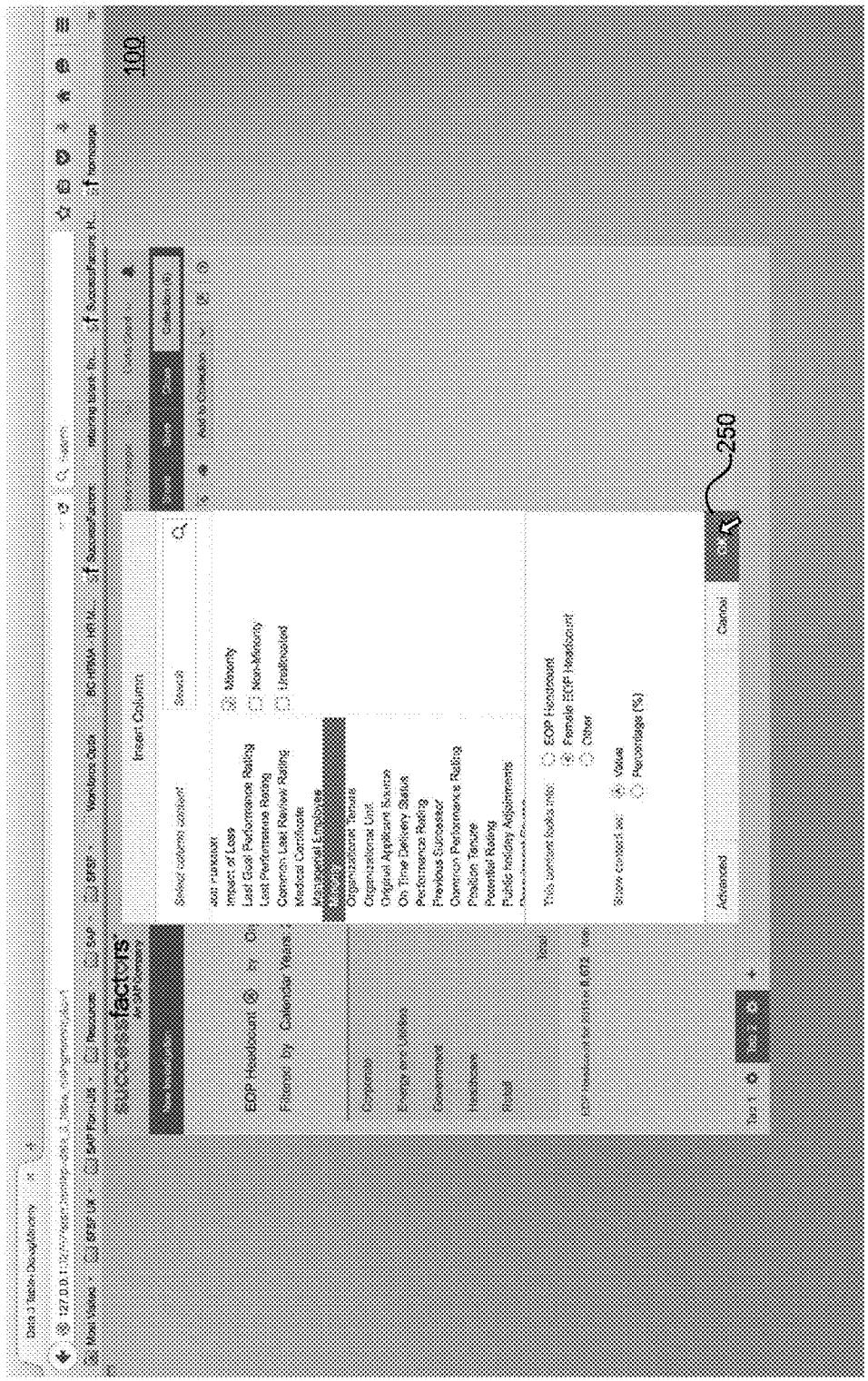
Figure 2P:
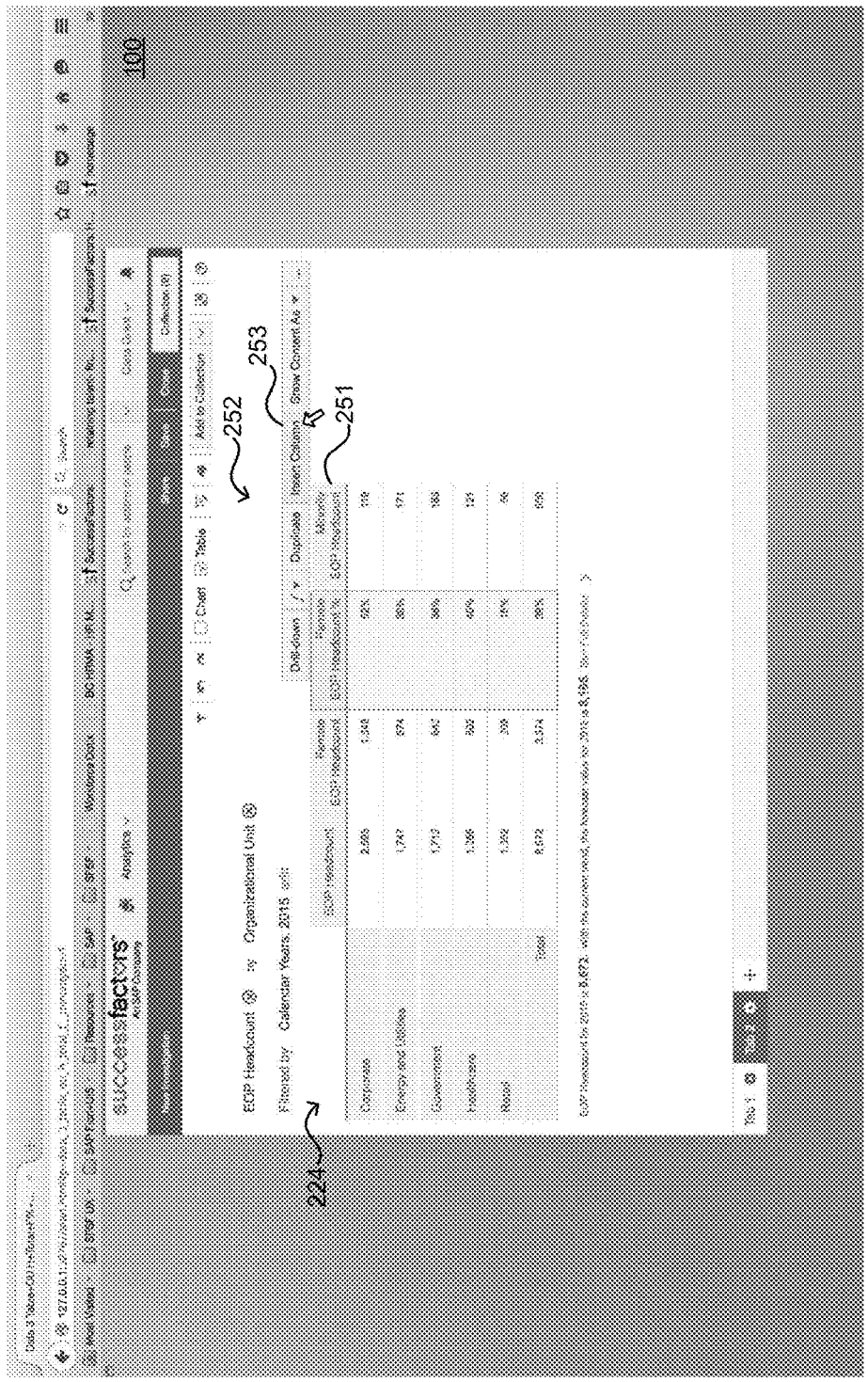
Figure 2Q:
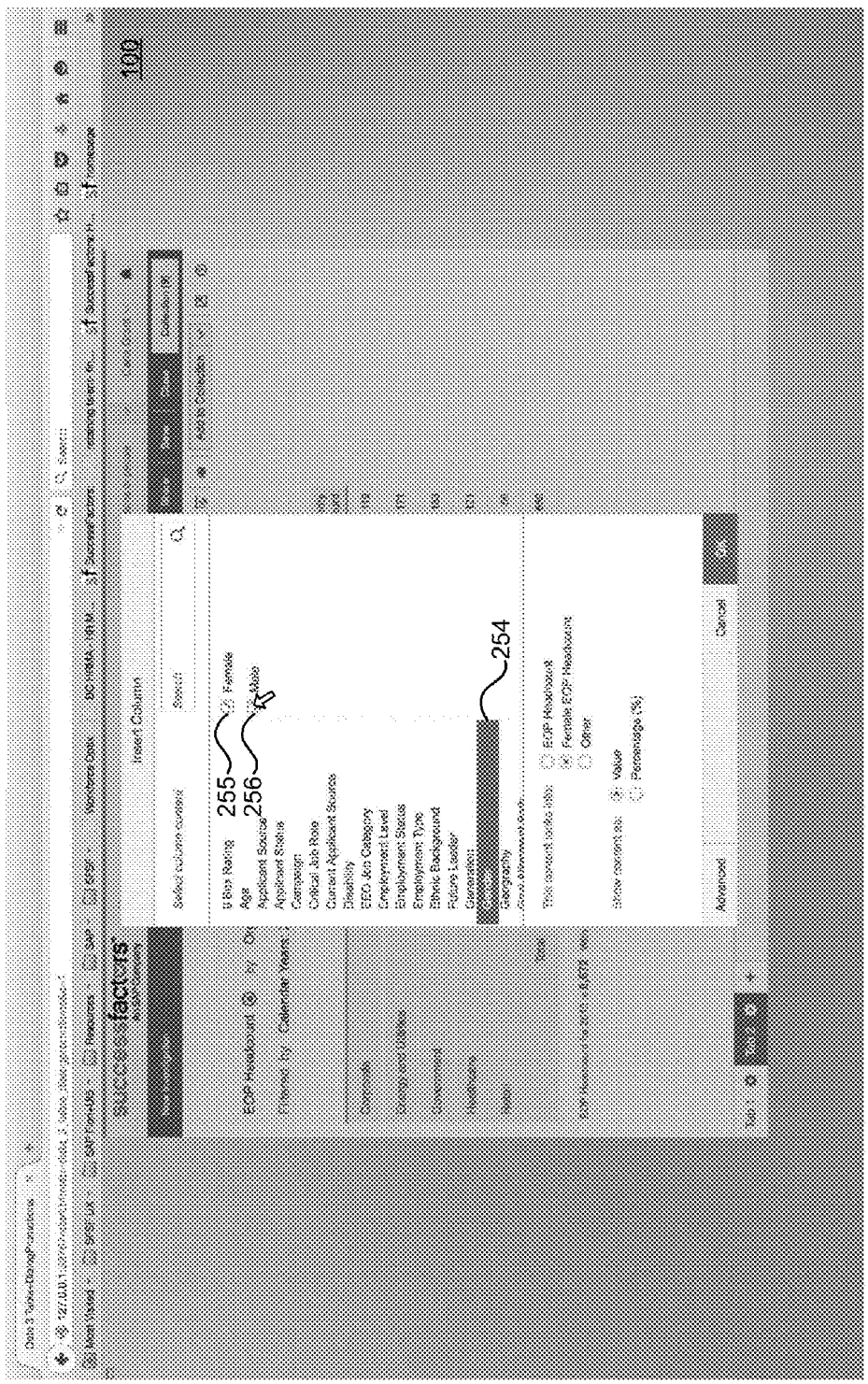
Figure 2R:
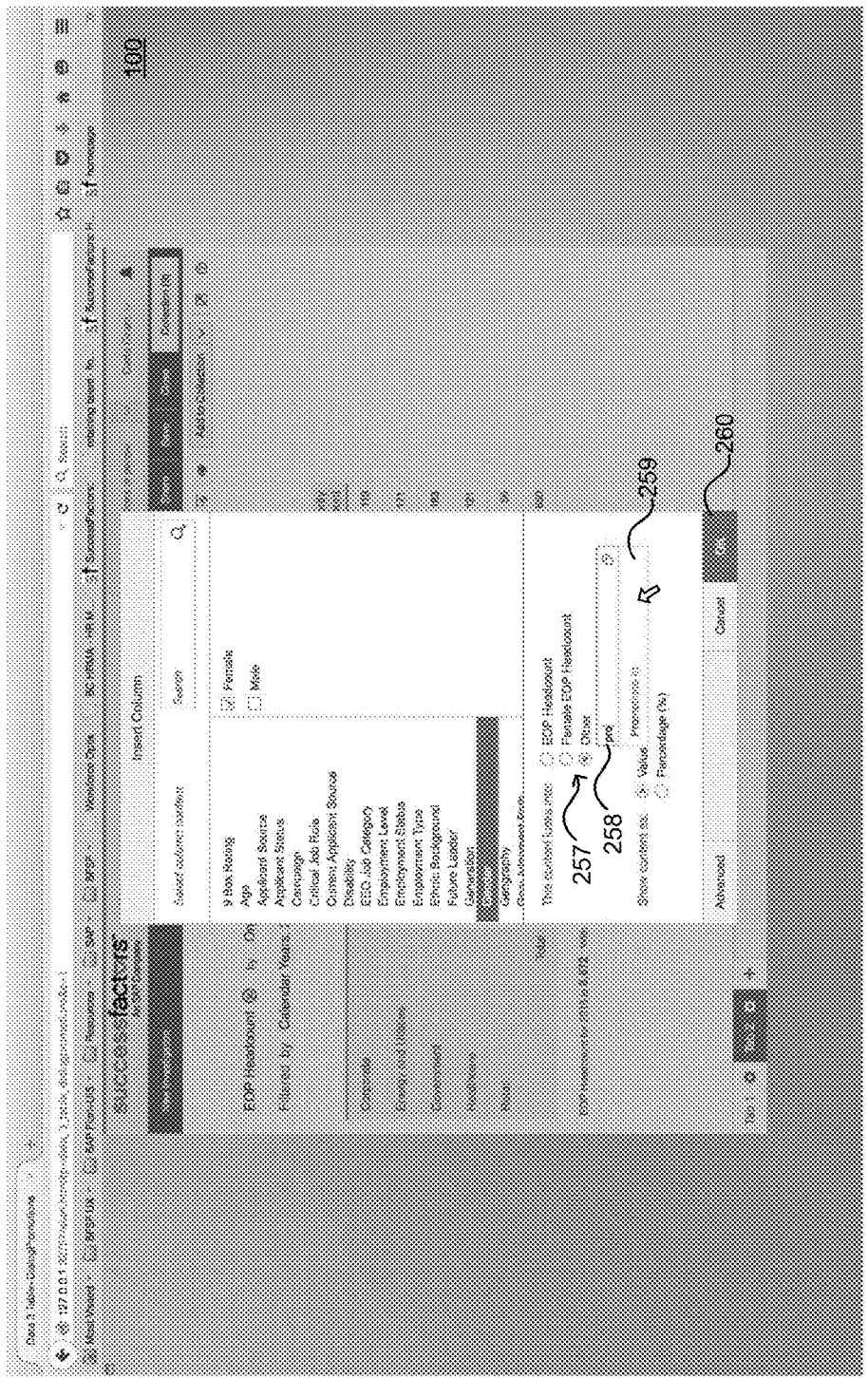
Figure 2S:
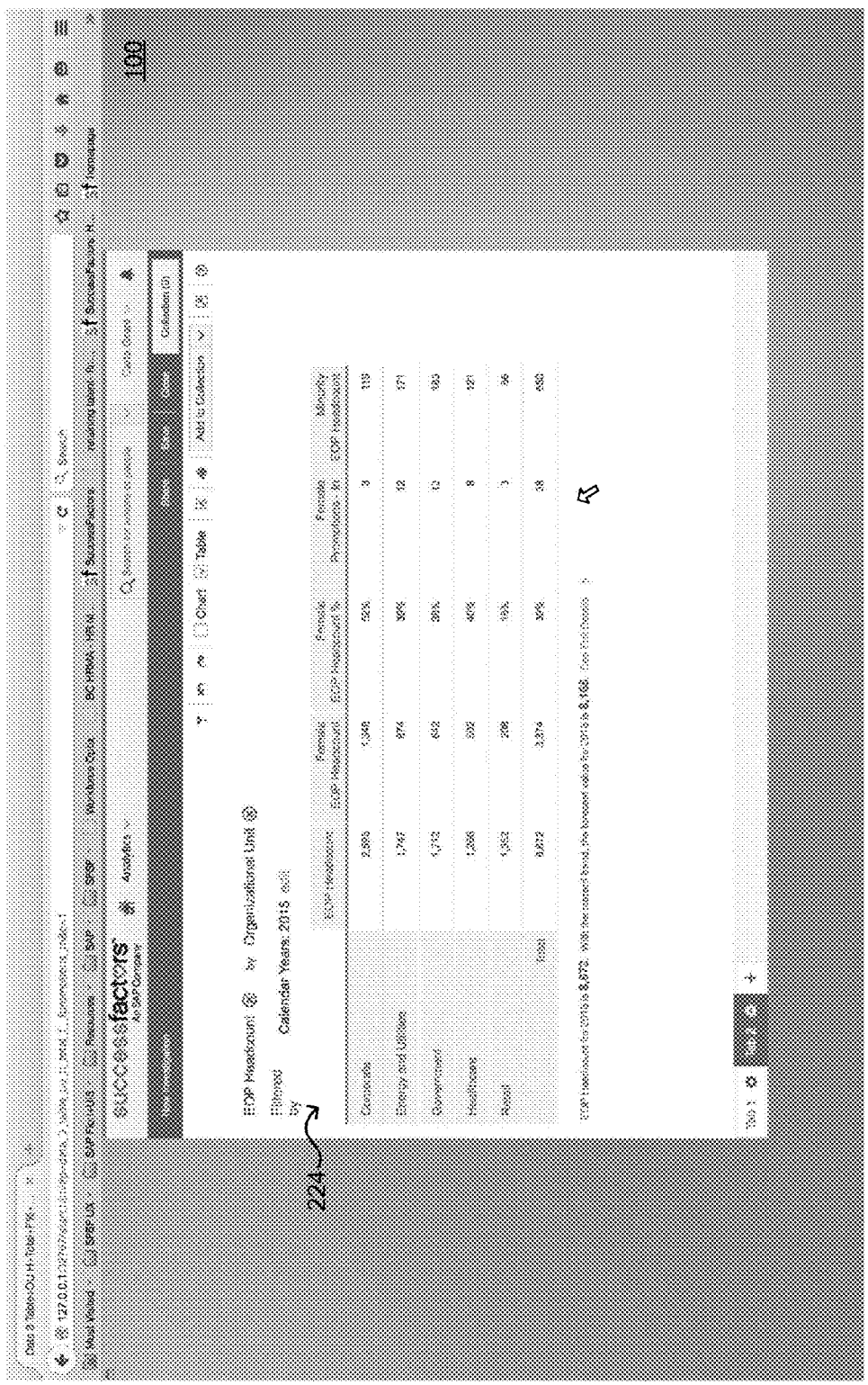

FIGS. 2A-2S illustrate a tool for automatically generating tabular visualizations according to some embodiments according to some embodiments. Specifically, FIGS. 2A-2S illustrate the GUI 100 at nineteen different stages 201-219 of generating tabular visualizations according to some embodiments.

In FIG. 2A, the first stage 201 is similar the tenth stage 110 shown in FIG. 1J except the user is selecting a selectable item 220 in the first stage 201. In particular, the first stage 201 shows the user using the selection tool to select the user selectable item 220 in order to create a new investigation page. Upon selection of the selectable item 220, the GUI 100 transitions to displaying a page that includes the pane displaying several selectable data variables illustrated in the third stage 103 of FIG. 1C.

In FIG. 2B, the second stage 202 shows the GUI 100 after the user selects the selectable item 220. As illustrated, the GUI 100 in the second stage 202 is displaying a selectable item 222 for selecting an "EOP Headcount" data variable. At the second stage 202, the user is using the selection tool to select the selectable item 222. Upon selection of the selectable item 222, the GUI 100 transitions to displaying a page that includes a visualization based on the "EOP Headcount" data variable.

In FIG. 2C, the third stage 203 illustrates the GUI 100 after the user selects the selectable item 222. As shown, the GUI 100 in the third stage 203 is displaying a trend visualization 223 of the "EOP Headcount" data variable that is automatically generated in response to the selection of the "EOP Headcount" data variable. Additionally, the GUI 100 in the third stage 203 is displaying a tabular visualization 224 of the "EOP Headcount" data variable. The third stage 203 also shows the user using the selection tool to select a selectable item 225. Upon selection of the selectable item 225, the GUI 100 transitions to displaying a page that does not include the trend visualization 223.

In FIG. 2D, the fourth stage 204 shows the GUI 100 after the user selects the selectable item 225. As shown, the GUI 100 in the fourth stage 204 is displaying a page similar to that shown in FIG. 2C except the trend visualization 223 is no longer displayed. At the fourth stage 204, the user is using the selection tool to select a selectable item 226 to add data associated with an "Organizational Unit" data variable to the tabular visualization 224. Upon selection of the selectable item 226, the GUI 100 updates the tabular visualization 224 to display data associated with an "Organizational Unit" data variable.

In FIG. 2E, the fifth stage 205 illustrates the GUI 100 after the user selects the selectable item 226. The GUI 100 in the fifth stage 205 is displaying the tabular visualization 224 that has been automatically updated in response to the selection of the "Organizational Unit" data variable. As shown in FIG. 2E, the tabular visualization 224 displays the "EOP Headcount" according to "Organization Unit" on a year by year basis. At the fifth stage 205, the user is also using the selection tool to select a selectable item 227. Upon selection of the selectable item 227, the GUI 100 updates the tabular visualization 224 to not include the "Calendar Years" data variable.

In FIG. 2F, the sixth stage 206 shows the GUI 100 after the user selects the selectable item 227. The GUI 100 in the sixth stage 206 is displaying the tabular visualization 224 that has been automatically updated in response to the exclusion of the "Calendar Year" data variable. As illustrated in FIG. 2F, the tabular visualization 224 displays the "EOP Headcount" according to "Organization Unit" for the 2015 year. The sixth stage 206 also shows the GUI 100 after the user selects a selectable item 228 for displaying a contextual menu 229 associated with "EOP Headcount" data and a selectable item 230 in the contextual menu 229 to display a selectable item 231. At the sixth stage 206, the user is using the selection tool to select the selectable item 231. Upon selection of the selectable item 231, the GUI 100 updates the tabular visualization 224 with a total for the "EOP Headcount" data variable.

In FIG. 2G, the seventh stage 207 illustrates the GUI 100 after the user selects the selectable item 231. The GUI 100 in the seventh stage 207 is displaying the tabular visualization 224 that has been automatically updated in response to the selection of a sum function for the "EOP Headcount" data variable. As shown in FIG. 2G, the tabular visualization 224 displays the "EOP Headcount" according to "Organization Unit" for the 2015 year as well as a total for the "EOP Headcount" data variable. At the seventh stage 207, the user is also using the selection tool to select a selectable item 232. Upon selection of the selectable item 232, the GUI 100 enables a "Full Screen" mode.

In FIG. 2H, the eighth stage 208 shows the GUI 100 after the user selects the selectable item 232. The GUI 100 in the eighth stage 208 is displaying the tabular visualization 224 in a "Full Screen" mode by removing the pane displaying the several selectable data variables. The eighth stage 208 also shows the GUI 100 after the user selects the selectable item 228 for displaying the contextual menu 229. At the eighth stage 208, the user is using the selection tool to select a selectable item 233 in the contextual menu 229 for inserting a column into the tabular visualization 224. Upon selection of the selectable item 233, the GUI 100 displays a page for selecting a data variable to be associated with a column that will be added to the tabular visualization 224.

In FIG. 2I, the ninth stage 209 illustrates the GUI 100 after the user selects the selectable item 233. The GUI 100 in the ninth stage 209 is overlaying a page for selecting a data variable associated with a column to be added to the tabular visualization 224. The ninth stage 209 also shows the GUI 100 after the user has selected a selectable item 234 to select a "Gender" data variable. In response to the selection of the selectable item 234, the GUI 100 displays selectable items 235 and 236.

In FIG. 2J, the tenth stage 210 shows the GUI 100 after the user selects the selectable item 236 to select the "Female" data variable by excluding the "Male" data variable from the "Gender" data variable. At the tenth stage 210, the user is using the selection tool to select a selectable item 237. Upon selection of the selectable item 237, the GUI 100 updates the tabular visualization 224 with a new column.

In FIG. 2K, the eleventh stage 211 illustrates the GUI 100 after the user selects the selectable item 237. The GUI 100 in the eleventh stage 211 is displaying the tabular visualization 224 that has been automatically updated in response to the addition of a column of data associated with the "Female" data variable. As shown, the tabular visualization 224 includes a column displaying "Female EOP Headcount" data according to "Organization Unit" for the 2015 year as well as a total for the "Female EOP Headcount" data variable. The eleventh stage 211 also shows the GUI 100 after the user selects a selectable item 238 for displaying a contextual menu 239 associated with "Female EOP Headcount". At the eleventh stage 211, the user is using the selection tool to select a selectable item 240 in the contextual menu 239 for adding a duplicate of a column in the tabular visualization 224 to the tabular visualization 224. Upon selection of the selectable item 240, the GUI 100 updates the tabular visualization 224 with a new column that is a duplicate of the column of data associate with the "Female EOP Headcount" data variable.

In FIG. 2L, the twelfth stage 212 illustrates the GUI 100 after the user selects the selectable item 240. The GUI 100 in the twelfth stage 212 is displaying the tabular visualization 224 that has been automatically updated in response to the addition of a column that is a duplicate of the column of data associated with the "Female EOP Headcount" data variable. As illustrated, the tabular visualization 224 includes an additional column displaying "Female EOP Headcount" data according to "Organization Unit" for the 2015 year as well as a total for the "Female EOP Headcount" data variable. The twelfth stage 212 also shows the GUI 100 after the user selects a selectable item 241 for displaying a contextual menu 242 associated with "Female EOP Headcount" data and a selectable item 243 in the contextual menu 242 to display a selectable item 244. At the twelfth stage 212, the user is using the selection tool to select the selectable item 244. Upon selection of the selectable item 244, the GUI 100 updates the tabular visualization 224 to display the data in newly added column as percentage values.

In FIG. 2M, the thirteenth stage 213 shows the GUI 100 after the user selects the selectable item 244. The GUI 100 in the thirteenth stage 213 is displaying the tabular visualization 224 that has been automatically updated in response to the modification the type of values displayed in a column of data associated with the "Female EOP Headcount" data variable. As shown, the right-most column in the tabular visualization 224 is displaying "Female EOP Headcount" data in percentage values according to "Organization Unit" for the 2015 year as well as a percentage value for a total for the "Female EOP Headcount" data variable. The thirteenth stage 213 also shows the GUI 100 after the user selects the selectable item 241 for displaying the contextual menu 242. At the thirteenth stage 213, the user is using the selection tool to select a selectable item 245 in the contextual menu 242 for inserting a column into the tabular visualization 224. Upon selection of the selectable item 245, the GUI 100 displays a page for selecting a data variable to be associated with a column that will be added to the tabular visualization 224.

In FIG. 2N, the fourteenth stage 214 illustrates the GUI 100 after the user selects the selectable item 245. The GUI 100 in the fourteenth stage 214 is overlaying a page for selecting a data variable associated with a column to be added to the tabular visualization 224. The fourteenth stage 214 also shows the GUI 100 after the user has selected a selectable item 246 to select a "Minority" data variable. In response to the selection of the selectable item 246, the GUI 100 displays selectable items 247, 248, and 249.

In FIG. 2O, the fifteenth stage 215 shows the GUI 100 after the user selects the selectable items 248 and 249 to select the "Minority" data variable by excluding the "Non-Minority" and "Unallocated" data variables from the "Minority" data variable. At the fifteenth stage 215, the user is using the selection tool to select a selectable item 250. Upon selection of the selectable item 250, the GUI 100 updates the tabular visualization 224 with a new column.

In FIG. 2P, the sixteenth stage 216 illustrates the GUI 100 after the user selects the selectable item 250. The GUI 100 in the sixteenth stage 216 is displaying the tabular visualization 224 that has been automatically updated in response to the addition of a column of data associated with the "Minority" data variable. As shown, the tabular visualization 224 includes a column displaying "Minority EOP Headcount" data according to "Organization Unit" for the 2015 year as well as a total for the "Minority EOP Headcount" data variable. The sixteenth stage 216 also shows the GUI 100 after the user selects a selectable item 251 for displaying a contextual menu 252 associated with "Minority EOP Headcount". At the sixteenth stage 216, the user is using the selection tool to select a selectable item 253 in the contextual menu 252 for inserting a column into the tabular visualization 224. Upon selection of the selectable item 253, the GUI 100 displays a page for selecting a data variable to be associated with a column that will be added to the tabular visualization 224.

In FIG. 2Q, the seventeenth stage 217 illustrates the GUI 100 after the user selects the selectable item 253. The GUI 100 in the seventeenth stage 217 is overlaying a page for selecting a data variable associated with a column to be added to the tabular visualization 224. The seventeenth stage 217 also shows the GUI 100 after the user has selected a selectable item 254 to select a "Gender" data variable. In response to the selection of the selectable item 254, the GUI 100 displays selectable items 255 and 256. At the seventeenth stage 217, the user is using the selection tool to select the selectable item 256 to select the "Female" data variable by excluding the "Male" data variable from the "Gender" data variable.

In FIG. 2R, the eighteenth stage 218 illustrates the GUI 100 after the user selects the selectable item 256. The eighteenth stage 218 shows the GUI 100 after the user selects an "other" option of a radio control 257 for data variable within the "Female" data variable and has provided an input control 258. When input is provided in input control 258, the GUI 100 updates the pane below the input control 258 with search results. In this example, the user has entered "pro" in the input control 258 and the GUI 100 updates the pane below the input control 258 with a selectable item 259 to select a "Promotions-In" data variable. In the eighteenth stage 218, the user uses the selection tool to select the selectable item 259.

In FIG. 2S, the nineteenth stage 219 shows the GUI 100 after the user selects a selectable item 260 in the eighteenth stage 218 for inserting a column into the tabular visualization 224. Upon selection of the selectable item 260 illustrated in FIG. 2R, the GUI 100 updates the tabular visualization 224 with a new column. The GUI 100 in the nineteenth stage 219 is displaying the tabular visualization 224 that has been automatically updated in response to the addition of a column of data associated with the "Female Promotions-In" data variable. As shown, the tabular visualization 224 includes a column displaying "Female Promotions-In" data according to "Organization Unit" for the 2015 year as well as a total for the "Female Promotions-In" data variable.

Figure 3:
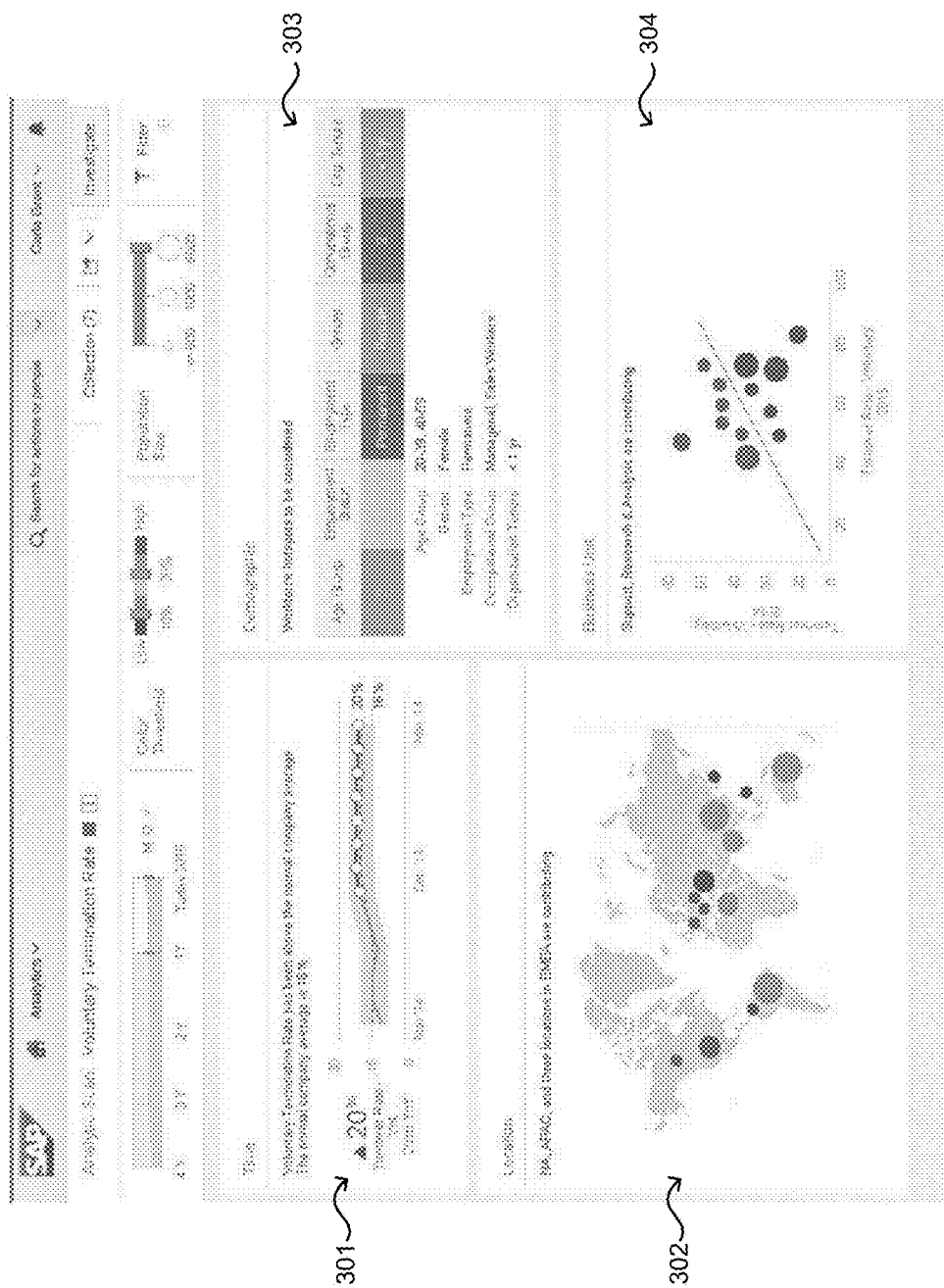
FIG. 3 illustrates a graphical user interface that includes automatically generated visualizations according to some embodiments.

FIG. 3 illustrates a GUI 300 that includes automatically generated visualizations according to some embodiments. As shown, the GUI 300 includes visualizations 301, 302, 303, and 304. Visualization 301 is generated based on time data variables, visualization 302 is generated based on location data variables, visualization 303 is generated based on demographic data variables, and visualization 304 is generated based on business unit data variables. One of ordinary skill in the art will understand that additional and/or different visualizations based on additional and/or different data variables may be included in the GUI 300.

Figure 4:
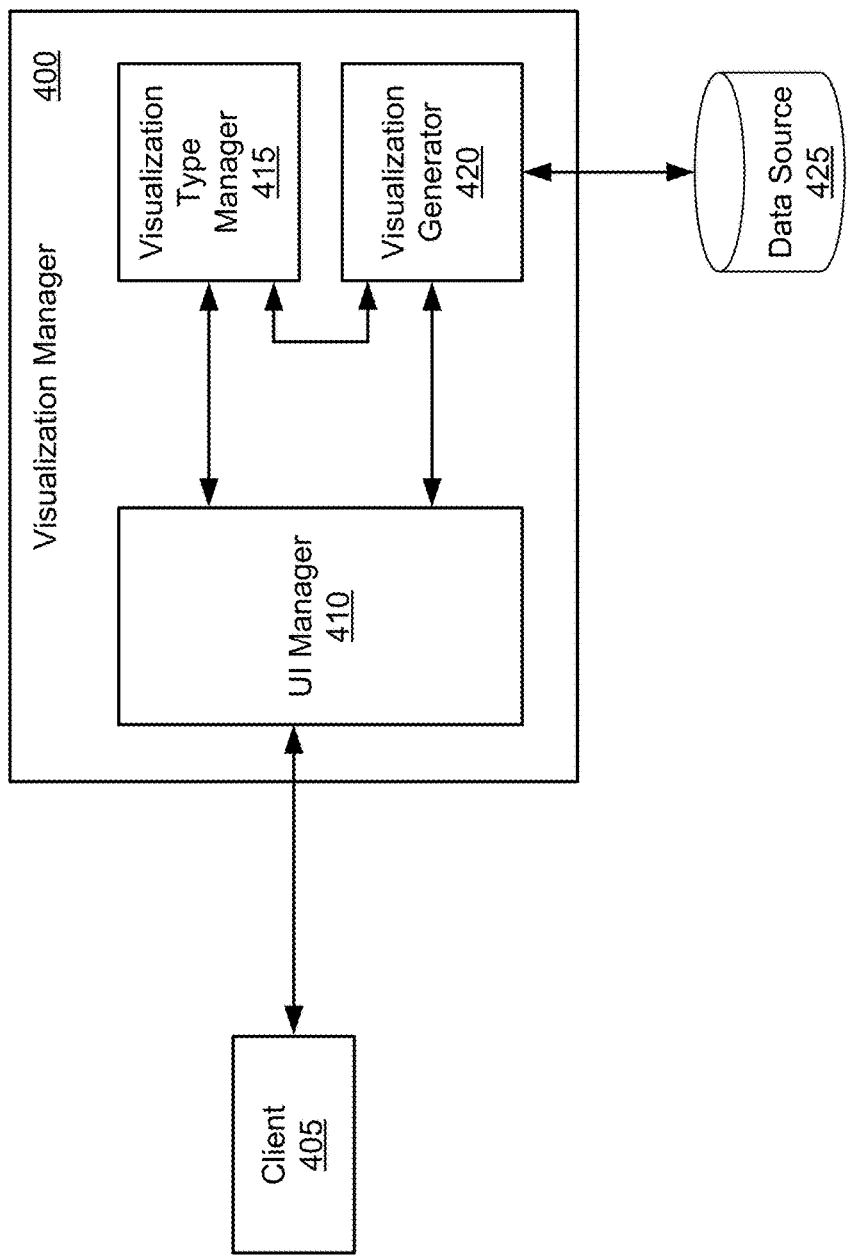
FIG. 4 illustrates an automated visualization manager according to some embodiments.

FIG. 4 illustrates a visualization manager 400 according to some embodiments. In some embodiments, visualization manager 400 is a visualization service or tool that is part of a multi-tenant, cloud-based system implemented using a software as a service (SaaS) methodology. One of ordinary skill in the art will understand that visualization manager 400 may be part of any number of different systems (e.g., a human capital management (HCM) system, an enterprise resource planning (ERP) system, a customer relationship management (CRM) system, a supply chain management (SCM) system, a product lifecycle management (PLM) system, etc.).

As shown, visualization manager 400 includes user interface (UI) manager 410, visualization type manager 415, and visualization generator 420. UI manager 410 handles generating and providing UIs (e.g., GUIs, command line interfaces (CLIs), etc.) to client 405 for interacting with visualization manager 400. For instance, UI manager 410 may generate and provide GUI 100 as shown in FIGS. 1A-1O and 2A-2S as well as GUI 300 as shown in FIG. 3. Client 405 may be any type of computing device (e.g., a mobile device, a smartphone, a laptop, a desktop computer, a tablet, etc.). Client 405 may include a thin client (e.g., a web browser) configured to interact with the UIs provided by UI manager 410. In some embodiments, client 405 and visualization manager 400 operate on the same computing device while, in other embodiments, client 405 and visualization manager 400 operate on separate computing devices.

UI manager 410 may receive a request to generate a visualization from a user of client 405. For example, a user of client 405 may select a set of measures, set of dimensions, and type of analysis via a GUI provided by UI manager 410. When UI manager 410 receives such selections from client 405, UI manager 410 forwards the selections to visualization type manager 415 for determination of a type of visualization. Upon receiving a determined type of visualization, UI manager 410 instructs visualization generator 420 to generate the type of visualization of the selected set of measures and set of dimensions. UI manager 410 then provides the generated visualization to client 405.

Visualization type manager 415 is configured to determine types of visualizations based on a set of criteria. In some embodiments, visualization type manager 415 receives a set of measures, a set of dimensions, and a type of analysis from UI manager 410. Based on the set of measures, the set of dimensions, and the type of analysis, visualization type manager 415 determines a type of visualization. In some embodiments, visualization type manager 415 determines a type of visualization by determining the number of measures in the set of measures, the number of dimensions in the set of dimensions, and the type of dimension of each dimension in the set of dimensions. Examples of types of dimensions may include a time-based dimension (e.g., a day dimension, a week dimension, a month dimension, a year dimension, etc.), a geography-based dimension (e.g., a city dimension, a postal code dimension, a longitude and/or latitude coordinate(s) dimension, a state dimension, a region dimension, a country dimension, a continent dimension, etc.), a non-time-based and non-geography-based dimension (e.g., product dimension, brand dimension, a color dimension, etc.), etc. Examples of types of analyses may include a trend analysis, a cycle analysis, a distribution analysis, a contribution analysis, a comparison analysis, a correlation analysis, a deviation analysis, a region analysis, a location analysis, etc., or any other type of analysis associated with data.

Based on the number of measures, the number of dimensions, the types of the dimensions, and the type of analysis, visualization type manager 415 determines a type of visualization. For instance, visualization type manager 415 may determine a line chart type of visualization when the number of measures is one, the number of dimensions is at least one, at least one dimension is a time-based dimension, and the type of analysis is a trend analysis or a cycle analysis.

Visualization type manager 415 may determine a type of visualization based on the number of measures, the number of dimensions, and the type of analysis. For example, visualization type manager 415 may determine a bar chart type of visualization when the number of measures is at least one, the number of dimensions is at least one, at least two dimensions are time-based dimensions, and the type of analysis is a distribution analysis, a contribution analysis, or a comparison analysis.

In some embodiments, a particular type of visualization may have several different subtypes of the type of visualization. For instance, a bar chart type of visualization may have a horizontal bar chart subtype and a vertical bar chart subtype. As mentioned above, visualization type manager 415 may determine a particular type of visualization based on the number of measures, the number of dimensions, and the type of analysis. In some embodiments, visualization type manager 415 may determine different subtypes of the particular type of visualization based on different types of dimensions. As explained above as an example, visualization type manager 415 may determine a bar chart type of visualization when the number of measures is at least one, the number of dimensions is at least one, at least two dimensions are time-based dimensions, and the type of analysis is a contribution analysis. In some instances, visualization type manager 415 may determine a vertical bar chart type when one dimension is a time-based dimension and determine a horizontal bar chart type when none of the dimensions are a time-based dimension.

Visualization generator 420 is responsible for generating visualizations of measures and dimensions. In some embodiments, visualization generator 420 receives a request from UI manager 410 to generate a type of visualization of a set of measures and a set of dimensions. In response to the request, visualization generator 420 accesses data storage 425. Data source 425 is configured to provide data to visualization generator 420. In some embodiments, data source 425 stores and manages data according to a dimensional modeling technique. For example, data source 425 stores and manages data according to measures and dimensions. As described above, a measure may be numerical value of data while a dimension may be data for categorizing the measures (i.e., the numerical values of data). In some embodiments, data source 425 is implemented by several storages (e.g., hard disk storages, flash memory storages, optical disc storages, etc.) while, in other embodiments, data source 425 is implemented by a single storage. In some embodiments, data source 425 is a database, a file, a data as a service (DaaS), a web service, etc. Upon accessing data storage 425, visualization generator 420 retrieves data associated with the set of measures and the set of dimensions. Visualization generator 420 then generates the requested visualization of the set of measures and the set of dimensions based on the retrieved data and sends the generated visualization to UI manager 410.

Figure 5:
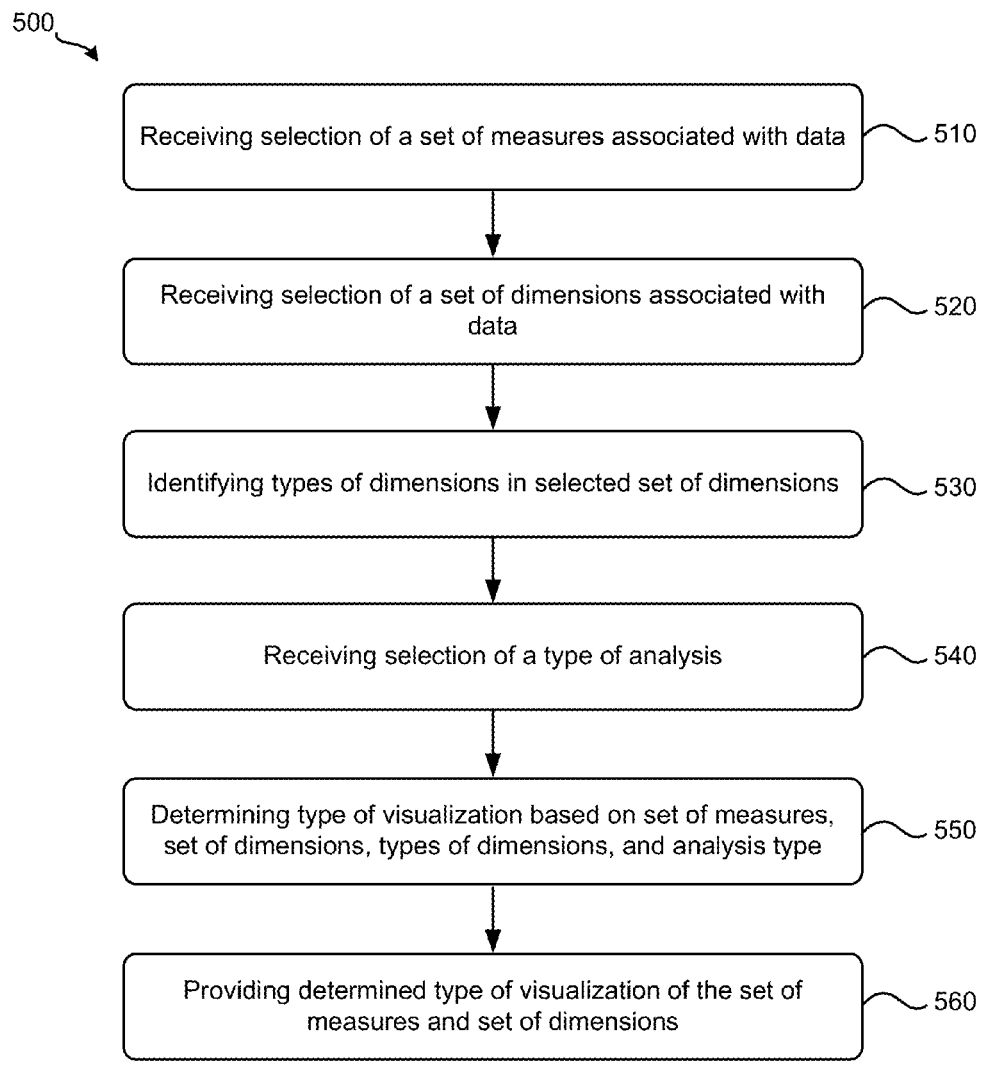
FIG. 5 illustrates a process for automatedly generating visualizations according to some embodiments.

FIG. 5 illustrates a process 500 for automatedly generating visualizations according to some embodiments. In some embodiments, a visualization manager (e.g., visualization manager 400) performs process 500. Process 500 starts by receiving, at 510, a selection of a set of measures associated with data. Referring to FIG. 4 as an example, UI manager 410 may receive a selection of a set of measures from client 405 via a GUI (e.g., a selection of a measure via GUI 100 as illustrated in FIG. 1C) that UI manager 410 provides to client 405.

Next, process 500 receives, at 520, a selection of a set of dimensions associated with data. Referring to FIG. 4 as an example, UI manager 410 may receive a selection of a set of dimensions from client 405 via a GUI (e.g., a selection of a dimension via the same or similar GUI as GUI 100 illustrated in FIG. 1C) that UI manager 410 provides to client 405.

Process 500 then identifies, at 530, the types of dimension in the selected set of dimensions. In particular, process 500 identifies the type of dimension for each dimension in the set of dimensions. Examples of types of dimensions include a time-based dimension (e.g., a day dimension, a week dimension, a month dimension, a year dimension, etc.), a geography-based dimension (e.g., a city dimension, a postal code dimension, a longitude and/or latitude coordinate(s) dimension, a state dimension, a region dimension, a country dimension, a continent dimension, etc.), a non-time-based and non-geography-based dimension (e.g., product dimension, brand dimension, a color dimension, etc.), etc.

Next, process 500 receives, at 540, a selection of a type of analysis. Examples of types of analyses may include a trend analysis, a cycle analysis, a distribution analysis, a contribution analysis, a comparison analysis, a correlation analysis, a deviation analysis, a region analysis, a location analysis, etc., or any other type of analysis associated with data. Referring to FIG. 4 as an example, UI manager 410 may receive a selection of a type of analysis from client 405 via a GUI (e.g., a selection of a dimension via the same or similar GUI as GUI 100 illustrated in FIG. 1C) that UI manager 410 provides to client 405.

Process 500 then determines, at 550, a type of visualization based on the set of measures, the set of dimensions, the types of dimensions, and the type of analysis. Referring to FIG. 4 as an example, visualization type manager 415 may perform operation 550 to determine a type of visualization in the same ways described above.

Finally, process 500 provides, at 560, the determined type of visualization of the set of measures and set of dimensions. Referring to FIG. 4 as an example, visualization generator 420 generates the determined type of visualization of the set of measures and set of dimensions and sends the generated visualization to UI manager 410, which in turn, performs operation 560 to provide the visualization to client 405 for display.

Figure 6:
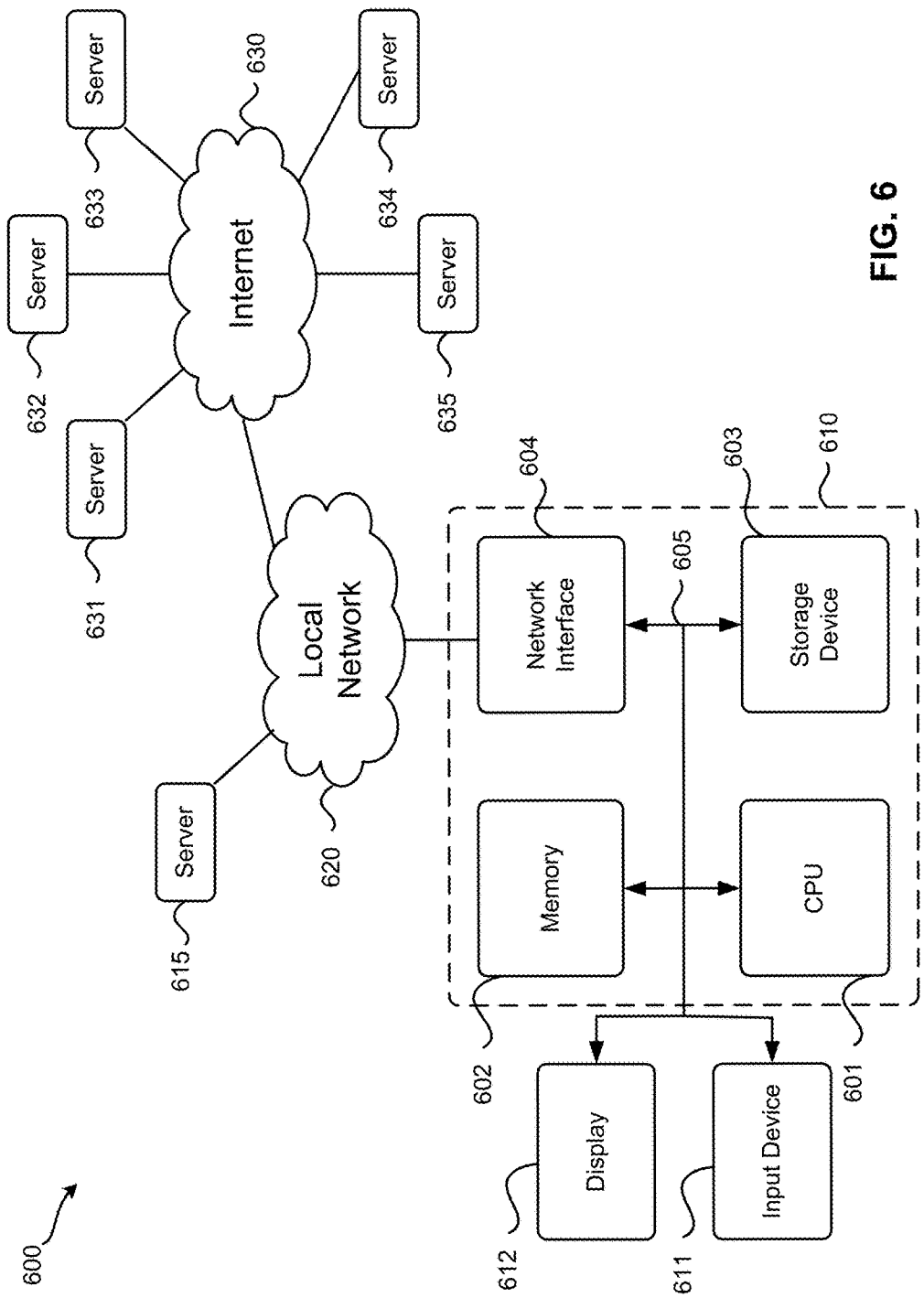
FIG. 6 illustrates an exemplary computer system according to one embodiment.

An exemplary computer system 600 is illustrated in FIG. 6. Computer system 610 includes a bus 605 or other communication mechanism for communicating information, and a processor 601 coupled with bus 605 for processing information. Computer system 610 also includes memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention. Based on the above disclosure, other arrangements, embodiments, implementations and equivalents will be evident to those skilled in the art and may be employed without departing from the spirit and scope of the invention.

What is claimed is:

1. A non-transitory computer-readable medium storing a program executable by at least one processing unit of a first device, the program comprising sets of instructions for:
   receiving, by the first device, a first selection from a second device, the first selection specifying a set of measures associated with data;
   receiving, by the first device, a second selection from the second device, the second selection specifying a set of dimensions associated with data;
   receiving, by the first device, a third selection from the second device, the third selection specifying a type of analysis;
   based on the set of measures, the set of dimensions, and the type of analysis, determining, by the first device, a type of visualization of the set of measures and the set of dimensions by:
      determining a number of measures in the set of measures;
      determining a number of dimensions in the set of dimensions;
      determining a first type of visualization as the type of visualization of the set of measures and the set of dimensions when the number of measures in the set of measures is one and the number of dimensions in the set of dimensions is one; and
      determining a second type of visualization as the type of visualization of the set of measures and the set of dimensions when the number of measures in the set of measures is one and the number of dimensions in the set of dimensions is two; and
   providing, by the first device, an instance of the type of visualization to the second device for the second device to display the instance of the type of visualization though a graphical user interface, the instance of the type of visualization comprising the set of measures associated with the data organized according to the set of dimensions associated with the data.

2. The non-transitory computer-readable medium of claim 1, wherein the program further comprises a set of instructions for generating, by the first device, the instance of the type of visualization of the set of measures and the set of dimensions.

3. The non-transitory computer-readable medium of claim 1, wherein the program further comprises a set of instructions for generating, by the first device, a message to be sent to a recipient of the message, the message comprising a copy of the instance of the type of visualization.

4. The non-transitory computer-readable medium of claim 1, wherein the program further comprises sets of instructions for:
   generating, by the first device, a table of the set of measures and the set of dimensions; and
   providing, by the first device, the table of the set of measures and the set of dimensions to the second device for the second device to simultaneously display the visualization of the set of measures and the set of dimensions and the table of the set of measures and the set of dimensions.

5. The non-transitory computer-readable medium of claim 1, wherein the set of instructions for determining the type of visualization further comprises sets of instructions for:
   determining a type of dimension for each dimension in the set of dimensions; and
   determining the type of visualization of the set of measures and the set of dimensions further based on the types of dimensions in the set of dimensions.

6. The non-transitory computer-readable medium of claim 5, wherein the set of instructions for determining the type of visualization further comprises sets of instructions for:
   determining a first subtype of the type of visualization of the set of measures and the set of dimensions when the set of dimensions includes a time-based dimension; and
   determining a second subtype of the type of visualization of the set of measures and the set of dimensions when the set of dimensions includes types of dimensions other than a time-based dimension.

7. The non-transitory computer-readable medium of claim 1, wherein the program further comprises a set of instructions for providing a graphical user interface (GUI) to the second device for receiving the first, second, and third selections.

8. A method, executable by a first device, comprising:
receiving, by the first device, a first selection from a second device, the first selection specifying a set of measures associated with data;
receiving, by the first device, a second selection from the second device, the second selection specifying a set of dimensions associated with data;
receiving, by the first device, a third selection from the second device, the third selection specifying a type of analysis;
based on the set of measures, the set of dimensions, and the type of analysis, determining, by the first device, a type of visualization of the set of measures and the set of dimensions by:
  determining a number of measures in the set of measures;
  determining a number of dimensions in the set of dimensions;
  determining a first type of visualization as the type of visualization of the set of measures and the set of dimensions when the number of measures in the set of measures is one and the number of dimensions in the set of dimensions is one; and
  determining a second type of visualization as the type of visualization of the set of measures and the set of dimensions when the number of measures in the set of measures is one and the number of dimensions in the set of dimensions is two; and
providing, by the first device, an instance of the type of visualization to the second device for the second device to display the instance of the type of visualization though a graphical user interface, the instance of the type of visualization comprising the set of measures associated with the data organized according to the set of dimensions associated with the data.

9. The method of claim 8 further comprising generating, by the first device, the instance of the type of visualization of the set of measures and the set of dimensions.

10. The method of claim 9 further comprising generating, by the first device, a message to be sent to a recipient of the message, the message comprising a copy of the instance of the type of visualization.

11. The method of claim 8 further comprising:
generating, by the first device, a table of the set of measures and the set of dimensions; and
providing, by the first device, the table of the set of measures and the set of dimensions to the second device for the second device to simultaneously display the visualization of the set of measures and the set of dimensions and the table of the set of measures and the set of dimensions.

12. The method of claim 8, wherein determining the type of visualization further comprises:
determining a type of dimension for each dimension in the set of dimensions; and
determining the type of visualization of the set of measures and the set of dimensions further based on the types of dimensions in the set of dimensions.

13. The method of claim 12, wherein for determining the type of visualization further comprises:
determining a first subtype of the type of visualization of the set of measures and the set of dimensions when the set of dimensions includes a time-based dimension; and
determining a second subtype of the type of visualization of the set of measures and the set of dimensions when the set of dimensions includes types of dimensions other than a time-based dimension.

14. The method of claim 8 further comprising providing a graphical user interface (GUI) to the second device for receiving the first, second, and third selections.

15. A system comprising:
a set of processing units;
a non-transitory machine-readable medium storing instructions that when executed by at least one processing unit in the set of processing units cause the at least one processing unit to:
  receive, by the system, a first selection from a device, the first selection specifying a set of measures associated with data;
  receive, by the system, a second selection from the device, the second selection specifying a set of dimensions associated with data;
  receive, by the system, a third selection from the device, the third selection specifying a type of analysis;
  based on the set of measures, the set of dimensions, and the type of analysis, determine, by the system, a type of visualization of the set of measures and the set of dimensions by:
    determining a number of measures in the set of measures;
    determining a number of dimensions in the set of dimensions;
    determining a first type of visualization as the type of visualization of the set of measures and the set of dimensions when the number of measures in the set of measures is one and the number of dimensions in the set of dimensions is one; and
    determining a second type of visualization as the type of visualization of the set of measures and the set of dimensions when the number of measures in the set of measures is one and the number of dimensions in the set of dimensions is two; and
  provide, by the system, an instance of the type of visualization to the device for the device to display the instance of the type of visualization though a graphical user interface, the instance of the type of visualization comprising the set of measures associated with the data organized according to the set of dimensions associated with the data.

16. The system of claim 15, wherein the instructions further cause the at least one processing unit to generate, by the system, the instance of the type of visualization of the set of measures and the set of dimensions.

17. The system of claim 16, wherein the instructions further cause the at least one processing unit to generate, by the system, a message to be sent to a recipient of the message, the message comprising a copy of the instance of the type of visualization.

18. The system of claim 15, wherein the instructions further cause the at least one processing unit to:
generate, by the system, a table of the set of measures and the set of dimensions; and
provide, by the system, the table of the set of measures and the set of dimensions to the device for the device to simultaneously display the visualization of the set of measures and the set of dimensions and the table of the set of measures and the set of dimensions.

19. The system of claim 15, wherein determining the type of visualization further comprises:

determining a type of dimension for each dimension in the set of dimensions; and determining the type of visualization of the set of measures and the set of dimensions further based on the types of dimensions in the set of dimensions.

20. The system of claim 19, wherein determining the type of visualization further comprises:

determining a first subtype of the type of visualization of the set of measures and the set of dimensions when the set of dimensions includes a time-based dimension; and determining a second subtype of the type of visualization of the set of measures and the set of dimensions when the set of dimensions includes types of dimensions other than a time-based dimension.

\* \* \* \* \*